(12) United States Patent
Makaran

(10) Patent No.: US 6,331,757 B1
(45) Date of Patent: *Dec. 18, 2001

(54) STAGGERED PULSE WIDTH MODULATION APPARATUS AND METHOD FOR EMI MINIMIZATION IN MOTOR

(75) Inventor: John Edward Makaran, London (CA)

(73) Assignee: Siemens Canada Limited, Mississauga (CA)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/100,000

(22) Filed: Jun. 19, 1998

(51) Int. Cl.$^7$ ........................................ H02P 6/02

(52) U.S. Cl. ............................ 318/254; 318/439

(58) Field of Search ................... 318/254, 439, 318/138, 701

(56) References Cited

U.S. PATENT DOCUMENTS

| | | | |
|---|---|---|---|
| 4,514,667 | * 4/1985 | Sakmann et al. | 318/254 |
| 4,644,234 | 2/1987 | Nola | 318/254 |
| 4,682,093 | 7/1987 | Murphy et al. | 318/701 |
| 4,720,663 | * 1/1988 | Welch et al. | 318/254 |
| 4,897,583 | * 1/1990 | Rees | 318/254 |
| 4,904,918 | 2/1990 | Bailey et al. | 318/762 |
| 5,221,881 | * 6/1993 | Cameron | 318/254 |
| 5,440,214 | 8/1995 | Peeters | 318/685 |
| 5,614,803 | 3/1997 | Morioka et al. | 318/801 |
| 5,616,996 | * 4/1997 | Tang et al. | 318/439 |
| 5,652,493 | 7/1997 | Hendershot, Jr. | 318/701 |
| 5,666,042 | 9/1997 | Lewis | 320/40 |
| 5,682,088 | * 10/1997 | Sonnek | 318/254 |

FOREIGN PATENT DOCUMENTS

| | | |
|---|---|---|
| 2745824B | 3/1979 | (DE). |
| 0676859A | 10/1995 | (EP). |

OTHER PUBLICATIONS

Patent Abstracts of Japan, vol. 096, No. 010, Oct. 31, 1996 from JP 08154395 A (Jun., 11, 1996).

Patent Abstracts of Japan, vol. 097, No. 001, Jan. 31, 1997 from JP 08242587 A (Sep. 17, 1996).

Patent Abstracts of Japan, vol. 018, No. 540, Oct. 14, 1994 from JP 0618953 A (Jul. 8, 1994).

* cited by examiner

Primary Examiner—Jonathan Salata

(57) ABSTRACT

An apparatus and method for minimizing electromagnetic interference in a unipolar phase motor having a supply current is provided. The motor further has a plurality of motor phases energizable with pulse width modulation (PWM). The method includes calculating the current harmonics on a right edge aligned PWM, calculating the current harmonics on a left edge aligned PWM pulse, determining the supply current by summing the current harmonics for the right edge aligned PWM pulse and the current harmonics for the left edge aligned PWM pulse, energizing a first motor phase with PWM, and staggering the PWM pulses for each successive motor phase by varying the energizing of any two adjacent energized phases based on the amount of supply current in the motor, the staggering of the PWM pulses minimizing electromagnetic interference and current harmonic generation due to an increase in the supply current.

42 Claims, 24 Drawing Sheets

DUTY CYCLE < 50%

DUTY CYCLE < 50%

DUTY CYCLE > 50%

DUTY CYCLE > 50%

FIG. 4
| STEP | PHASE A | PHASE B | PHASE C | PHASE D | PHASE E |
|---|---|---|---|---|---|
| 1 | ACTIVE | ACTIVE | INACTIVE | INACTIVE | INACTIVE |
| 2 | INACTIVE | ACTIVE | ACTIVE | INACTIVE | INACTIVE |
| 3 | INACTIVE | INACTIVE | ACTIVE | ACTIVE | INACTIVE |
| 4 | INACTIVE | INACTIVE | INACTIVE | ACTIVE | ACTIVE |
| 5 | ACTIVE | INACTIVE | INACTIVE | INACTIVE | ACTIVE |
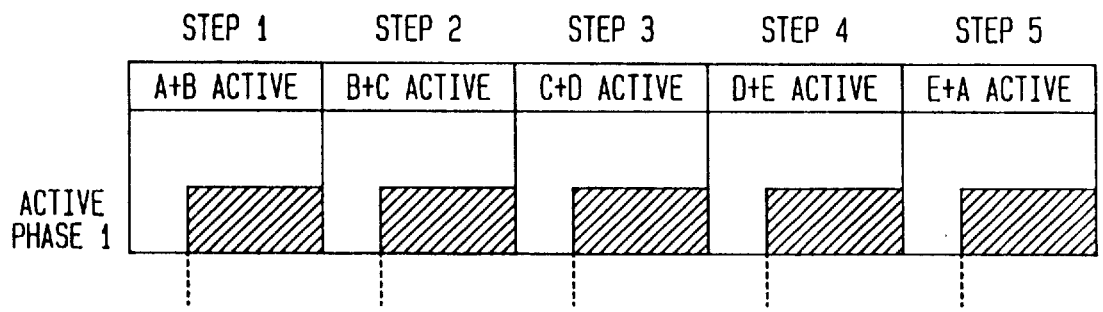
FIG. 5A
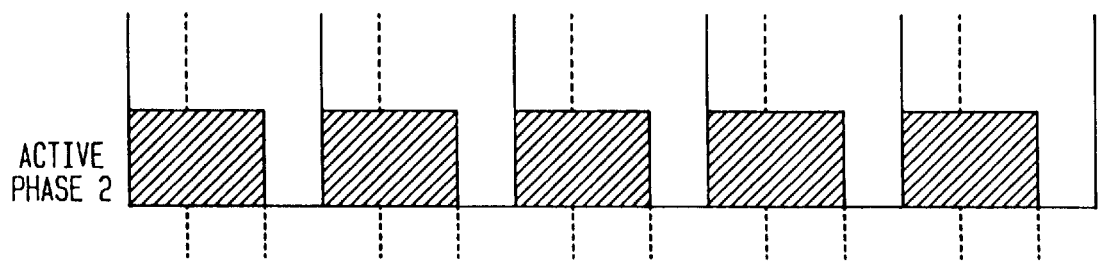
FIG. 5B
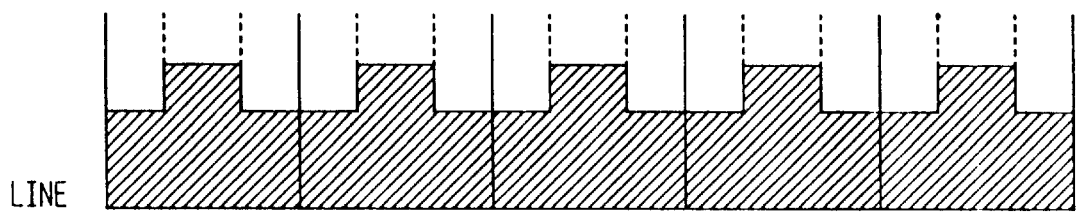
FIG. 5C

▫ -I (VBAT)

FIG. 21A

| HARMONIC NO | PROPOSED PWM FOURIER COEFFICIENT | CONVENTIONAL PWM FOURIER COEFFICIENT | FREQUENCY (Hz) |
|---|---|---|---|
| 1 | 1.48E-01 | 1.53E-01 | 2.34E+04 |
| 2 | 1.22E-01 | 1.48E-01 | 4.68E+04 |
| 3 | 8.36E-02 | 1.39E-01 | 7.02E+04 |
| 4 | 4.09E-02 | 1.28E-01 | 9.36E+04 |
| 5 | 1.51E-03 | 1.15E-01 | 1.17E+05 |
| 6 | 3.03E-02 | 1.00E-01 | 1.40E+05 |
| 7 | 4.94E-02 | 8.52E-02 | 1.64E+05 |
| 8 | 5.64E-02 | 7.05E-02 | 1.87E+05 |
| 9 | 5.40E-02 | 5.73E-02 | 2.11E+05 |
| 10 | 4.66E-02 | 4.66E-02 | 2.34E+05 |
| 11 | 3.81E-02 | 3.93E-02 | 2.57E+05 |
| 12 | 3.01E-02 | 3.56E-02 | 2.81E+05 |
| 13 | 2.19E-02 | 3.46E-02 | 3.04E+05 |
| 14 | 1.22E-02 | 3.47E-02 | 3.28E+05 |
| 15 | 1.45E-03 | 3.47E-02 | 3.51E+05 |
| 16 | 9.19E-03 | 3.39E-02 | 3.74E+05 |
| 17 | 1.77E-02 | 3.22E-02 | 3.98E+05 |
| 18 | 2.31E-02 | 2.97E-02 | 4.21E+05 |
| 19 | 2.51E-02 | 2.70E-02 | 4.45E+05 |
| 20 | 2.45E-02 | 2.45E-02 | 4.68E+05 |
| 21 | 2.22E-02 | 2.27E-02 | 4.91E+05 |
| 22 | 1.88E-02 | 2.18E-02 | 5.15E+05 |
| 23 | 1.42E-02 | 2.17E-02 | 5.38E+05 |
| 24 | 8.30E-03 | 2.19E-02 | 5.62E+05 |
| 25 | 1.58E-03 | 2.20E-02 | 5.85E+05 |
| 26 | 5.19E-03 | 2.18E-02 | 6.08E+05 |
| 27 | 1.10E-02 | 2.11E-02 | 6.32E+05 |
| 28 | 1.51E-02 | 2.00E-02 | 6.55E+05 |
| 29 | 1.73E-02 | 1.88E-02 | 6.79E+05 |
| 30 | 1.78E-02 | 1.77E-02 | 7.02E+05 |
| 31 | 1.69E-02 | 1.70E-02 | 7.25E+05 |
| 32 | 1.47E-02 | 1.68E-02 | 7.49E+05 |
| 33 | 1.14E-02 | 1.69E-02 | 7.72E+05 |
| 34 | 6.99E-03 | 1.72E-02 | 7.96E+05 |
| 35 | 1.80E-03 | 1.74E-02 | 8.19E+05 |
| 36 | 3.54E-03 | 1.73E-02 | 8.42E+05 |
| 37 | 8.30E-03 | 1.69E-02 | 8.66E+05 |
| 38 | 1.19E-02 | 1.63E-02 | 8.89E+05 |
| 39 | 1.42E-02 | 1.56E-02 | 9.13E+05 |
| 40 | 1.51E-02 | 1.50E-02 | 9.36E+05 |
| 41 | 1.47E-02 | 1.47E-02 | 9.59E+05 |
| 42 | 1.32E-02 | 1.48E-02 | 9.83E+05 |
| 43 | 1.05E-02 | 1.51E-02 | 1.01E+06 |
| 44 | 6.69E-03 | 1.54E-02 | 1.03E+06 |
| 45 | 2.13E-03 | 1.57E-02 | 1.05E+06 |
| 46 | 2.66E-03 | 1.56E-02 | 1.08E+06 |
| 47 | 7.09E-03 | 1.54E-02 | 1.10E+06 |
| 48 | 1.06E-02 | 1.49E-02 | 1.12E+06 |
| 49 | 1.30E-02 | 1.45E-02 | 1.15E+06 |
| 50 | 1.42E-02 | 1.42E-02 | 1.17E+06 |
| DC COMP. | -7.88E-02 | -7.75E-02 | |

FIG. 22A

| HARMONIC NO | PROPOSED PWM FOURIER COEFFICIENT | CONVENTIONAL PWM FOURIER COEFFICIENT | FREQUENCY (Hz) |
|---|---|---|---|
| 1 | 4.14E-02 | 6.79E+00 | 2.34E+04 |
| 2 | 6.58E-01 | 6.55E-01 | 4.68E+04 |
| 3 | 1.80E-02 | 2.24E+00 | 7.02E+04 |
| 4 | 3.36E-01 | 3.51E-01 | 9.36E+04 |
| 5 | 2.36E-02 | 1.35E+00 | 1.17E+05 |
| 6 | 2.20E-01 | 2.40E-01 | 1.40E+05 |
| 7 | 1.94E-02 | 9.63E-01 | 1.64E+05 |
| 8 | 1.68E-01 | 1.98E-01 | 1.87E+05 |
| 9 | 2.25E-02 | 7.50E-01 | 2.11E+05 |
| 10 | 1.32E-01 | 1.68E-01 | 2.34E+05 |
| 11 | 2.00E-02 | 6.14E-01 | 2.57E+05 |
| 12 | 1.13E-01 | 1.55E-01 | 2.81E+05 |
| 13 | 2.22E-02 | 5.21E-01 | 3.04E+05 |
| 14 | 9.49E-02 | 1.42E-01 | 3.28E+05 |
| 15 | 2.05E-02 | 4.53E-01 | 3.51E+05 |
| 16 | 8.48E-02 | 1.37E-01 | 3.74E+05 |
| 17 | 2.22E-02 | 4.01E-01 | 3.98E+05 |
| 18 | 7.42E-02 | 1.31E-01 | 4.21E+05 |
| 19 | 2.10E-02 | 3.60E-01 | 4.45E+05 |
| 20 | 6.82E-02 | 1.29E-01 | 4.68E+05 |
| 21 | 2.25E-02 | 3.27E-01 | 4.91E+05 |
| 22 | 6.10E-02 | 1.26E-01 | 5.15E+05 |
| 23 | 2.15E-02 | 2.99E-01 | 5.38E+05 |
| 24 | 5.73E-02 | 1.26E-01 | 5.62E+05 |
| 25 | 2.29E-02 | 2.77E-01 | 5.85E+05 |
| 26 | 5.21E-02 | 1.25E-01 | 6.08E+05 |
| 27 | 2.22E-02 | 2.57E-01 | 6.32E+05 |
| 28 | 4.95E-02 | 1.26E-01 | 6.55E+05 |
| 29 | 2.35E-02 | 2.41E-01 | 6.79E+05 |
| 30 | 4.55E-02 | 1.25E-01 | 7.02E+05 |
| 31 | 2.29E-02 | 2.27E-01 | 7.25E+05 |
| 32 | 4.38E-02 | 1.27E-01 | 7.49E+05 |
| 33 | 2.42E-02 | 2.14E-01 | 7.72E+05 |
| 34 | 4.06E-02 | 1.28E-01 | 7.96E+05 |
| 35 | 2.38E-02 | 2.03E-01 | 8.19E+05 |
| 36 | 3.94E-02 | 1.30E-01 | 8.42E+05 |
| 37 | 2.51E-02 | 1.94E-01 | 8.66E+05 |
| 38 | 3.67E-02 | 1.31E-01 | 8.89E+05 |
| 39 | 2.48E-02 | 1.85E-01 | 9.13E+05 |
| 40 | 3.59E-02 | 1.34E-01 | 9.36E+05 |
| 41 | 2.62E-02 | 1.78E-01 | 9.59E+05 |
| 42 | 3.37E-02 | 1.36E-01 | 9.83E+05 |
| 43 | 2.60E-02 | 1.71E-01 | 1.01E+06 |
| 44 | 3.31E-02 | 1.39E-01 | 1.03E+06 |
| 45 | 2.74E-02 | 1.65E-01 | 1.05E+06 |
| 46 | 3.12E-02 | 1.42E-01 | 1.08E+06 |
| 47 | 2.74E-02 | 1.59E-01 | 1.10E+06 |
| 48 | 3.09E-02 | 1.46E-01 | 1.12E+06 |
| 49 | 2.90E-02 | 1.54E-01 | 1.15E+06 |
| 50 | 2.91E-02 | 1.50E-01 | 1.17E+06 |
| DC COMP. | 5.27E+00 | -5.24E+00 | |

FIG. 23A

| HARMONIC NO | PROPOSED PWM FOURIER COEFFICIENT | CONVENTIONAL PWM FOURIER COEFFICIENT | FREQUENCY (Hz) |
|---|---|---|---|
| 1 | 2.22E+00 | 2.34E+00 | 2.34E+04 |
| 2 | 1.82E+00 | 2.25E+00 | 4.68E+04 |
| 3 | 1.24E+00 | 2.07E+00 | 7.02E+04 |
| 4 | 5.84E-01 | 1.80E+00 | 9.36E+04 |
| 5 | 1.25E-02 | 1.54E+00 | 1.17E+05 |
| 6 | 3.58E-01 | 1.24E+00 | 1.40E+05 |
| 7 | 5.08E-01 | 9.01E-01 | 1.64E+05 |
| 8 | 4.67E-01 | 5.84E-01 | 1.87E+05 |
| 9 | 2.82E-01 | 2.99E-01 | 2.11E+05 |
| 10 | 4.69E-02 | 4.72E-02 | 2.34E+05 |
| 11 | 1.97E-01 | 2.05E-01 | 2.57E+05 |
| 12 | 3.04E-01 | 3.64E-01 | 2.81E+05 |
| 13 | 2.90E-01 | 4.71E-01 | 3.04E+05 |
| 14 | 1.84E-01 | 5.32E-01 | 3.28E+05 |
| 15 | 2.85E-02 | 5.29E-01 | 3.51E+05 |
| 16 | 1.25E-01 | 4.77E-01 | 3.74E+05 |
| 17 | 2.19E-01 | 3.97E-01 | 3.98E+05 |
| 18 | 2.21E-01 | 2.86E-01 | 4.21E+05 |
| 19 | 1.43E-01 | 1.55E-01 | 4.45E+05 |
| 20 | 3.62E-02 | 3.60E-02 | 4.68E+05 |
| 21 | 9.34E-02 | 9.63E-02 | 4.91E+05 |
| 22 | 1.69E-01 | 2.01E-01 | 5.15E+05 |
| 23 | 1.81E-01 | 2.80E-01 | 5.38E+05 |
| 24 | 1.24E-01 | 3.22E-01 | 5.62E+05 |
| 25 | 2.39E-02 | 3.37E-01 | 5.85E+05 |
| 26 | 7.49E-02 | 3.22E-01 | 6.08E+05 |
| 27 | 1.39E-01 | 2.73E-01 | 6.32E+05 |
| 28 | 1.54E-01 | 2.02E-01 | 6.55E+05 |
| 29 | 1.13E-01 | 1.22E-01 | 6.79E+05 |
| 30 | 3.23E-02 | 3.26E-02 | 7.02E+05 |
| 31 | 6.48E-02 | 6.65E-02 | 7.25E+05 |
| 32 | 1.25E-01 | 1.44E-01 | 7.49E+05 |
| 33 | 1.37E-01 | 2.05E-01 | 7.72E+05 |
| 34 | 1.01E-01 | 2.51E-01 | 7.96E+05 |
| 35 | 3.07E-02 | 2.68E-01 | 8.19E+05 |
| 36 | 5.10E-02 | 2.57E-01 | 8.42E+05 |
| 37 | 1.13E-01 | 2.27E-01 | 8.66E+05 |
| 38 | 1.29E-01 | 1.77E-01 | 8.89E+05 |
| 39 | 9.62E-02 | 1.07E-01 | 9.13E+05 |
| 40 | 3.39E-02 | 3.39E-02 | 9.36E+05 |
| 41 | 4.64E-02 | 4.70E-02 | 9.59E+05 |
| 42 | 1.03E-01 | 1.18E-01 | 9.83E+05 |
| 43 | 1.24E-01 | 1.79E-01 | 1.01E+06 |
| 44 | 9.65E-02 | 2.18E-01 | 1.03E+06 |
| 45 | 3.20E-02 | 2.38E-01 | 1.05E+06 |
| 46 | 4.15E-02 | 2.38E-01 | 1.08E+06 |
| 47 | 9.70E-02 | 2.13E-01 | 1.10E+06 |
| 48 | 1.18E-01 | 1.66E-01 | 1.12E+06 |
| 49 | 9.77E-02 | 1.09E-01 | 1.15E+06 |
| 50 | 3.96E-02 | 4.03E-01 | 1.17E+06 |
| DC COMP. | -1.08E+01 | -1.08E+01 | |

DUTY CYCLE < 50%

DUTY CYCLE > 50%

DUTY CYCLE < 50%

DUTY CYCLE > 50%

US 6,331,757 B1

STAGGERED PULSE WIDTH MODULATION APPARATUS AND METHOD FOR EMI MINIMIZATION IN MOTOR

BACKGROUND OF THE INVENTION

1. Field of the Invention

This invention relates generally to a unipolar phase DC brushless motor and, more particularly, it relates to a staggered pulse width modulation (PWM) apparatus and method for electromagnetic interference (EMI) minimization in a unipolar phase DC brushless motor.

2. Background of Related Art

In any four (4), or five (5) phases, of a unipolar brushless DC motor, only two of the motor phases are energized at any given time. For instance, in a four (4) phase motor (essentially a two phase motor), only two motor phases are energized at any given time resulting in only fifty (50%) percent of the copper being utilized at any given time during operation of the motor. Likewise, in a five (5) phase motor, only two (2) motor phases are energized at any given time during operation of the motor.

FIG. 24 is a graph illustrating the conventional technique of simultaneously energizing the active phases of a unipolar brushless DC motor when pulse width modulation (PWM) is used.

In particular, since the supply current ripple of the motor is proportional to the current in the two (2) motor phases which are switched on simultaneously, there is a significant contribution to high frequency electromagnetic interference (EMI) on the motor supply leads. The electromagnetic interference is typically due to noise caused by the rate of change in supply current (di/dt) in the high power stage of a printed circuit board (PCB) where high inductance exists. Generally, high impedance traces exist because of space limitations placed on designers to provide a high power electronic motor package in minimal packaging space.

FIGS. 25A to 25D show a modulation of the width of each of the pulses within the activation phase shown in FIG. 24. In particular, FIGS. 25A and 25B show the same pulsed signals in an activation phase, with each of the pulsed signals having a duty cycle of less than 50%. FIGS. 25C and 25D show pulsed signals having a duty cycle of greater than 50%.

Conventional techniques have attempted to minimize electromagnetic interference from motors. For instance, U.S. Pat. No. 5,440,214 to Peeters (hereinafter 'Peeters') discloses drive control and interface apparatus for driving a stepper motor. The drive control and interface apparatus of Peeters attempts to minimize possible electrical noise spikes by turning the drives on and off with a fixed delay between the turn on and turn off times. Unfortunately, Peeters does not address minimization of noise harmonics due to variations in line current when two phases are turned on, nor when the current in both coils increases simultaneously.

U.S. Pat. No. 5,666,042 to Lewis discloses a switching current spike limiter for a three phase coupled inductor conductive battery changer. The current spike limiter of Lewis includes a PWM driver which boosts the voltage by pulse width modulating the lower switches in a concurrent or staggered fashion. Unfortunately, Lewis fails to disclose details regarding the staggering, e.g., whether the staggering is conducted with a fixed or variable delay, nor the intended purpose of the staggering of the pulses. Furthermore, the current spike limiter of Lewis relates specifically to a battery charger, not to a drive for a motor.

Accordingly, there exists a need for providing a motor drive which minimizes EMI in a unipolar or bipolar phase DC brushless motor. Moreover, there is a need for providing a motor drive which minimizes noise harmonics caused by an increase in the supply current during the time the current in two coils is increasing.

SUMMARY OF THE INVENTION

In accordance with the principles of the present invention, a motor driver circuit comprises a first driver to activate a first winding of the motor with a first pulsed signal. A second driver activates a second winding of the motor with a second pulsed signal. Individual pulses of the first pulsed signal are staggered with respect to individual pulses of the second pulsed signal.

A method for minimizing electromagnetic interference in a motor having a supply current and a plurality of motor phases in accordance with the principles of the present invention comprises staggering individual pulses in any one activation of a phase of the motor by alternately energizing any two windings of the motor.

In accordance with another aspect of the present invention, a method of driving a motor comprises simultaneously activating a first winding of the motor and the second winding of the motor during a same phase. The first winding is driven with a first pulsed signal, and the second winding is driven with a second pulsed signal. Individual pulses of the first pulsed signal are staggered with respect to individual pulses of the second pulsed signal.

In accordance with yet another aspect of the present invention, a method for minimizing electromagnetic interference in a unipolar phase motor having a supply current, the motor further having a plurality of motor phases energizable with a pulsed signal, comprises calculating current harmonics on a right edge aligned pulsed signal. Current harmonics are calculated on a left edge aligned pulsed signal. A supply current is determined by summing the calculated current harmonics for the right edge aligned pulsed signal and the current harmonics for the left edge aligned pulsed signal. One of the plurality of motor phases is energized. Individual pulses of the right edge aligned pulsed signal are staggered with respect to individual pulses of the left edge aligned pulsed signal for each successive motor phase by varying an activation of any two adjacently energized phases based on the determined supply current, whereby at least one of electromagnetic interference and current harmonic generation due to any increase in the supply current are minimized.

BRIEF DESCRIPTION OF THE DRAWINGS

Features and advantages of the present invention will become apparent to those skilled in the art from the following description with reference to the drawings, in which:

FIG. 4 shows the sequencing of the five phases of the driver circuit shown in FIG. 3, in accordance with the principles of the present invention.

FIGS. 5A to 5C show the staggered PWM technique and resulting power usage in accordance with the principles of the present invention.

FIGS. 21A and 21B compare the conventional current harmonic content of current supply versus the current harmonic content of current supply for a staggered pulse width modulation apparatus and method for EMI minimization in a unipolar phase DC brushless motor constructed in accordance with the principles of the present invention, at a ten (10%) duty cycle;

FIGS. 22A and 22B compare the conventional current harmonic content of current supply versus the current harmonic content of current supply for a staggered pulse width modulation apparatus and method for EMI minimization in a unipolar phase DC brushless motor constructed in accordance with the principles of the present invention, at a fifty (50%) duty cycle;

FIGS. 23A and 23B compare the conventional current harmonic content of current supply versus the current harmonic content of current supply for a staggered pulse width modulation apparatus and method for EMI minimization in a unipolar phase DC brushless motor constructed in accordance with the principles of the present invention, at a ninety (90%) duty cycle;

FIGS. 27A and 27B show the conventional simultaneous energization of two phases in block commutation, while

DETAILED DESCRIPTION OF ILLUSTRATIVE EMBODIMENTS

The present invention provides a motor with activation stages having staggered pulses within respective pulsed signals to two or more windings of the motor. The present inventor has determined that the staggering of PWM pulses reduces electromagnetic interference (EMI) minimization in a DC brushless motor. Moreover, the staggered PWM pulses result in a significant reduction in current harmonic generation, as well as a significant reduction in the generation of conducted EMI due to delta -I noise.

Figure 1:
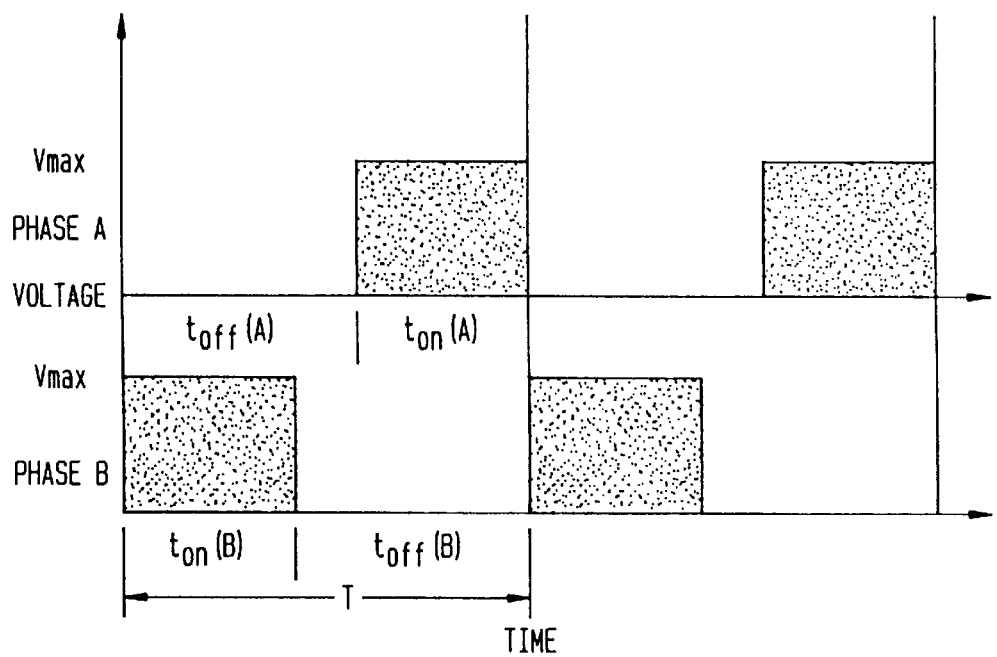
FIG. 1 is a graph illustrating a staggered pulse width modulation apparatus and method for EMI minimization in a unipolar phase DC brushless motor constructed in accordance with the principles of the present invention.

FIG. 1 shows an example of the staggering of pulses within a PWM activation signal to activate two phases of a motor.

In particular, e.g. as shown in FIG. 1, two motor windings or phases are activated substantially simultaneously. However, the drive pulses to the respective motor windings or phases are staggered in time with respect to one another. As will be discussed in more detail herein below, staggered drive pulses reduce EMI radiation considerably with respect to the conventional PWM technique, e.g., as shown in FIG. 25.

FIGS. 2A to 2D show how duty cycle can be changed with respect to the staggered pulses.

Figure 2A:
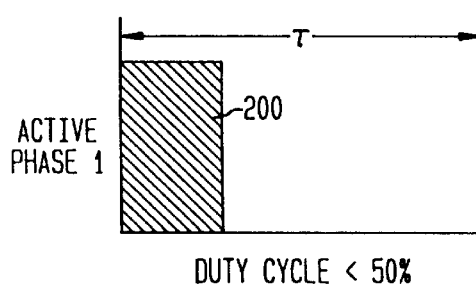
FIGS. 2A and 2B show the staggered activation of two phases of a motor at a duty cycle of less than 50%, in accordance with the principles of the present invention.
Figure 2B:
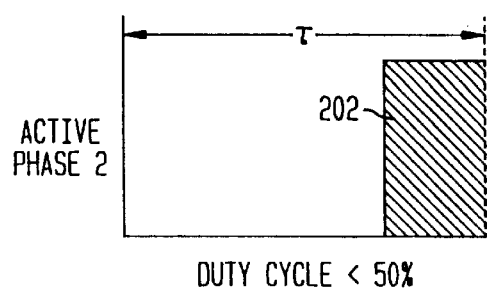
Figure 2C:
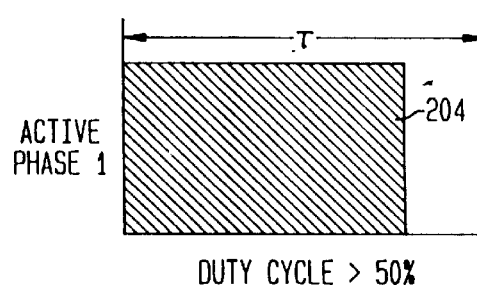
FIGS. 2C and 2D show the staggered activation of two phases of a motor at a duty cycle of greater than 50%, in accordance with the principles of the present invention.
Figure 2D:
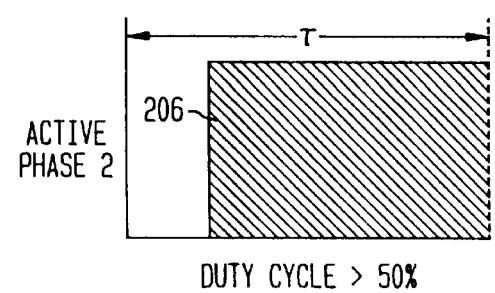

In particular, FIG. 2A shows one drive pulse of an activated phase 1 having a duty cycle of less than 50%, i.e., the on-time of the drive pulse 200 is less than 50% of the time constant τ of the motor phase winding. The oppositely staggered drive pulse 202 shown in FIG. 2B is repeatedly applied during the same activation period, but right justified to the time constant τ. FIGS. 2C and 2D show respective drive pulses 204, 206 for a pulsed activation signal having a duty cycle of more than 50%. Note that even though the drive pulses 204, 206 are staggered, they may nevertheless overlap for a period of time about the center of the time constant τ.

Figure 3:
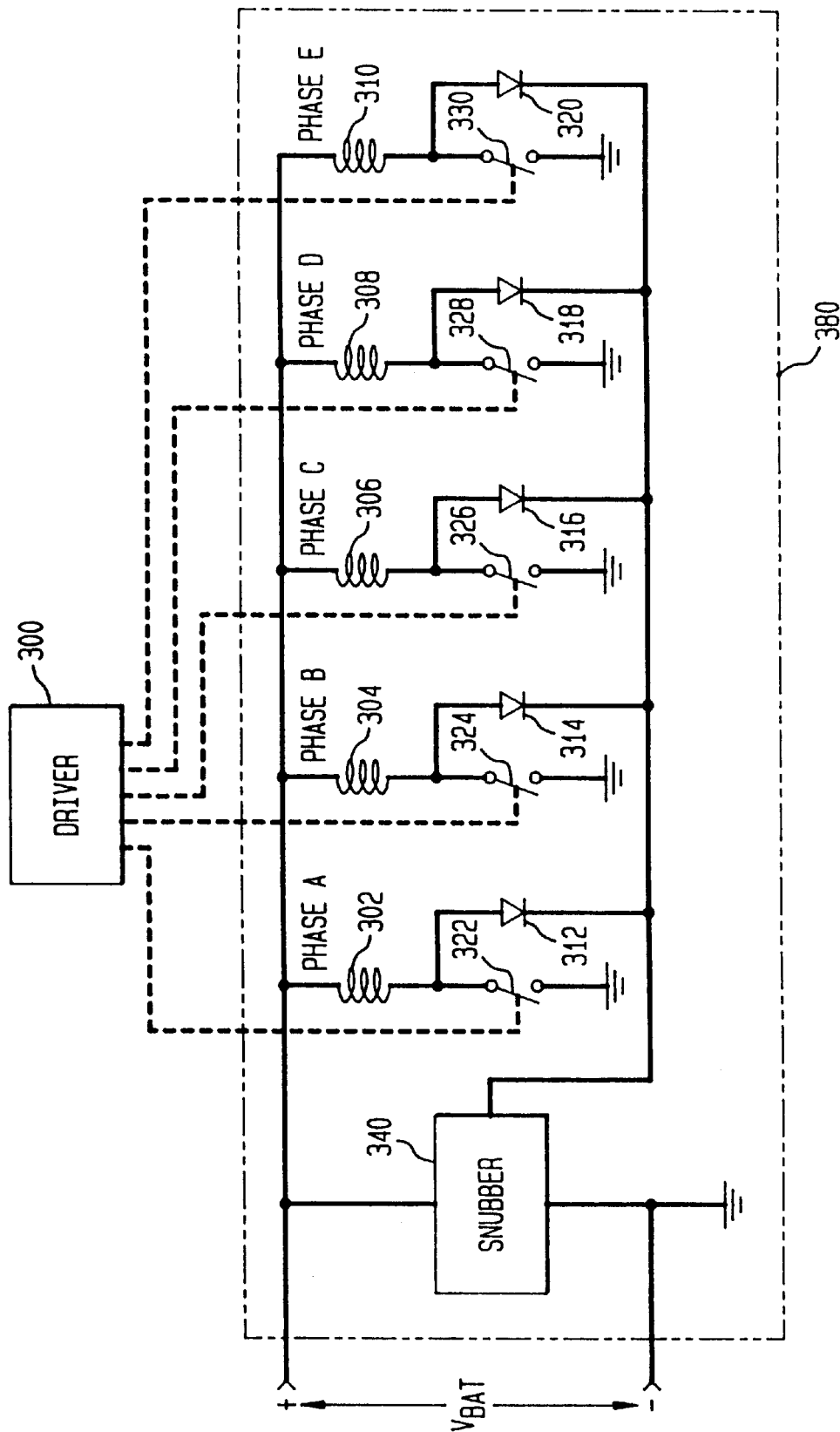
FIG. 3 shows a five phase motor being driven by a driver circuit built in accordance with the principles of the present invention.

FIG. 3 shows a five-phase motor 380 being driven by a driver 300 constructed and arranged in accordance with the principles of the present invention. It is to be noted that although the present embodiment is described with respect to a five-phase motor, the present invention is equally applicable to drivers and motors of any number of phases where two or more phases are energized at any given time.

In particular, the motor 380 comprises five windings or phases 302–310 which are either driven from a power source $V_{BAT}$ through a respective diode 312–320 or grounded. The windings 302–310 are each activated by the closing of a respective switch 322–330, which are each controlled by the driver 300. The switches may be any suitable power electronic device such as a transistor (e.g., MOSFET, Darlington, or IGBT), SCR, GTO or even a relay 322–330 if switching speeds are sufficiently low. The driver 300 provides a pulsed control signal such as a PWM signal to each of the five phases 302–310 of the motor 380. However, in accordance with the principles of the present invention, the driver 300 staggers the pulses of the PWM activation signals to each of the phases 302–310 of the motor 380.

FIG. 4 shows the phase sequence of the exemplary five-phase motor 380 shown in FIG. 3.

In particular, in a first step, two windings of the motor 380, Phase A and Phase B, are active and the other windings, i.e., Phases C, D and E are inactive. Thus, during the first step, only Phases A and B receive the PWM pulsed signal from the driver 300 shown in FIG. 3.

In a second step, Phases B and C are activated and Phases A, D and E are inactivated. Similarly, Phases C and D are activated in a third step, Phases D and E are activated in a fourth step, and Phases E and A are activated in a fifth step. Thereafter steps 1 to 5 repeat to rotate the rotor of the motor 380.

FIGS. 5A to 5C show steps 1 to 5 of FIG. 4 in graphical form.

In particular, each of the drive pulses for one winding in steps 1 to 5 are shown in FIG. 5A, and the drive pulses for another winding in steps 1 to 5 are shown in FIG. 5B. Note that the drive pulses of the activated windings shown in FIG. 5A are staggered with respect to other substantially simultaneously activated windings shown in FIG. 5B.

FIG. 5C shows the amount of energy drawn by the motor 380 with respect to the staggered drive pulses shown in FIGS. 5A to 5C. Note that the highest power is drawn at a center of the activation time period, and that the beginning and end portions of the amount of energy drawn during each step is at a minimum, i.e., equal to the power drawn by only a single winding.

The particular theories of the reduction in EMI and other advantages provided by the present invention are explained to give a better appreciation of the magnitude of the present invention.

Presume that a motor winding having a resistance R and an inductance L is driven with a voltage which is turned on and off at a high frequency. Typically, in motor drives, the pulse width modulation frequency is in the order of tens of kilohertz above the range of human hearing. The current used by the motor winding is varied by varying either the duty cycle or the pulse width of the constant frequency signal.

The supply voltage $V_m$ across a conventional motor winding is opposed by a back EMF voltage having a magnitude E. The back EMF, E, is proportional to the speed of the motor, and is represented by following equation:

$$E = K_e \omega (V)$$

Where, $K_e$=Electrical Constant of the Motor of Concern (V rad$^{-1}$ s$^{-1}$), and ω=angular motor speed (rad$^{-1}$ s$^{-1}$).

In general, the following equation applies when a voltage Vm appears across a winding having a resistance R and an inductance L:

$$Vm - E - L(di/dt) - R = 0$$

Assuming that the motor phase winding initially has a current flowing equal to $I_0$ at the instant voltage is applied across the motor windings, the general solution for current i(t) in the motor phase winding is represented by the following equation:

$$i(t) = I_0 + ((V_m - E)/R)(1 - e^{-t/\tau})$$

Where, $V_m$=The applied voltage across the motor phase winding (V);

$I_0$=The initial current through the motor winding (A);

R=The DC resistance of the motor phase winding (Ω);

t=The elapsed time since coil turned on (s); and

τ=The time constant of the motor phase winding=LI R (s).

Figure 6:
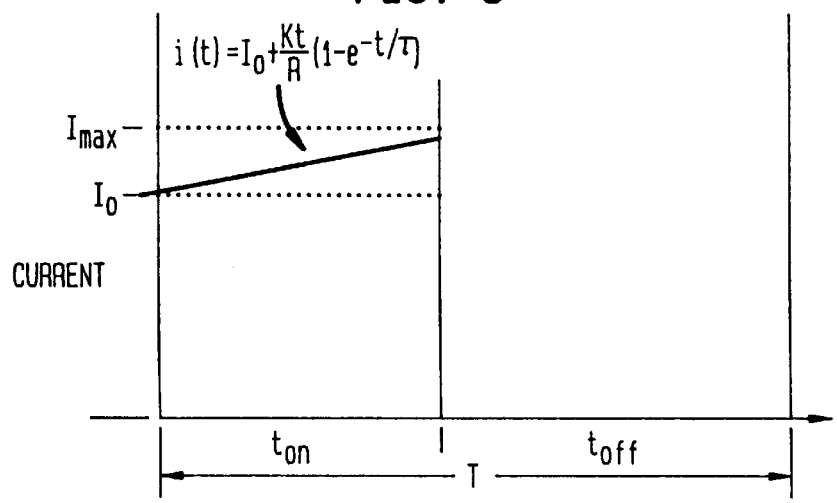
FIG. 6 is a graph illustrating a conventional supply current during a steady state PWM operation according to Lenz's law.

If the applied voltage $V_m$ is suddenly removed from the motor winding and the winding is bypassed by a free wheeling diode connected to a voltage source, the current in the motor winding will have two components. From Lenz's law, a voltage appears at the bottom of the coil which is in opposition to the supply voltage, as illustrated in FIG. 6.

One contribution of motor phase current during coil turn off is due to the free wheeling current from the voltage source appearing at the bottom of the motor winding as a result of the removal of the applied motor voltage $V_m$. The other component will be due to the contribution of the motor back EMF. The voltage source in series with the free wheeling diode should be set to equal E+$V_d$ as a minimum to prevent the contribution of current flowing through the winding due to the motor back EMF. If the motor back EMF is conducted through the free wheeling diode, braking torque and poor motor efficiency will result. If it is assumed that the voltage in series with the free wheeling diode is equal to the magnitude of the motor back EMF, there will be no contribution of motor back EMF to the motor winding current during motor turn off. Hence, the only current in the motor winding will be due to the free wheeling of the current in motor winding. It follows, the magnitude of current in the motor winding during coil turn off will be equal to:

$$i(t) = I_0' e^{-t/\tau} (A)$$

Where, $I_0'$=the magnitude off the coil current at coil turn off (A); and
t=the elapsed time since the coil is turned off.

As illustrated in FIG. 6, given the equations for the current in the motor coil, the supply current for the motor during steady state operation is illustrated. It follows that the supply current during the period of the PWM waveform is as follows when $t_{on}$ is active, assuming that $(V_m-E)/R=$ constant=K.

$$i(t)=I_0+(K\,t/R)(1-e^{-t/\tau})$$

Where $I_0$=current at end of $t_{off}$.

During $t_{off}$, there is no contribution of supply current since the switch is turned off and the current in the motor coil is free wheeling.

In order to predict the current harmonics of a motor, a Fourier analysis must be performed. The Fourier analysis will be performed on the supply current for a right edge aligned PWM pulse and for a left edge aligned PWM pulse. For the case where both phases are energized simultaneously, the supply current will the sum of the current contribution of two right edge aligned PWM pulses. For the case where the two phases are energized by staggered PWM pulses in accordance with the principles of the present invention, the supply current will be the sum of the current contribution of a right edge aligned PWM pulse and a left edge aligned PWM pulse.

As evident to a person skilled in the art, the Fourier representation of any function with respect to time may be represented as the following equation:

$$f(t) = a_0 + \sum_{n=1}^{n=\infty} (a_n \cos(nt) + b_n \sin(nt))$$

Where:

$$a_0 = \frac{1}{T} \int_0^T f(t)\,dt$$

$$a_n = \frac{2}{T} \int_0^T f(t)\cos\left(\frac{2\pi}{T}\right)t\,dt$$

$$b_n \frac{2}{T} \int_0^T f(t)\cos\left(\frac{2\pi}{T}\right)t\,dt$$

The magnitude of the nth current harmonic is represented by the following equation:

$$C_n \sqrt{a_n + b_n}$$

The phase angle is represented by the following equation:

$$\Theta_n = ATAN\left(\frac{-b_n}{a_n}\right)$$

A staggered pulse width modulation in accordance with the principles of the present invention provides for the calculation of Fourier coefficients of supply current for the left edge aligned PWM pulse and the right edge aligned PWM pulse as follows:

$$a_0 = \frac{1}{T} \int_0^T f(t)\,dt$$

-continued $$a_0 = \frac{1}{T} \int_0^{t_{on}} I_O + Kt(1 - e^{-t/\tau})\,dt$$

$$= \frac{1}{T}\left[\int_0^{t_{on}} I_o + \int_0^{t_{on}} Kt\,dt - \int_0^{t_{on}} Kte^{-t/\tau}\,dt\right]$$

$$= \frac{1}{T}[(I_o + K)t_{on} + K\tau(1 - e^{-t/\tau})]$$

$$a_n = \frac{2}{T} \int_0^T f(t)\cos\left(\frac{2\pi}{T}\right)t\,dt$$

$$= \frac{2}{T} \int_0^{t_{on}} [I_o + K(1 - e^{-t/\tau})]\cos\left(\frac{2\pi}{T}\right)t\,dt$$

$$= \frac{2}{T}\left[\int_0^{t_{on}} (I_o + K)\cos\left(\frac{2\pi}{T}\right)t\,dt - \int_0^{t_{on}} Ke^{-t/\tau}\cos\left(\frac{2\pi}{T}\right)t\,dt\right]$$

Letting $a=2\pi/T$:

$$a_n = \frac{2(I_o + K)}{T}\left[\frac{\sin(at)}{a}\right]_0^{t_{on}} -$$

$$\frac{2K}{T}\left[\frac{e^{-t/\tau}((1/\tau)\cos(at) + a\sin(at))}{(1/\tau)^2 + a^2}\right]_0^{t_{on}}$$

$$= \frac{2(I_o + K)}{T}\left[\frac{\sin(at_{on})}{a}\right] -$$

$$\frac{2K}{T}\left[\frac{e^{-t_{on}/\tau}((1/\tau)\cos(at_{on}) + a\sin(at_{on}) - (1/\tau))}{(1/\tau)^2 + a^2}\right]$$

$$b_n = \frac{2}{T} \int_0^T f(t)\sin\left(\frac{2\pi}{T}\right)t\,dt$$

$$= \frac{2}{T} \int_0^{t_{on}} [I_o + K(1 - e^{t/\tau})]\sin\left(\frac{2\pi}{T}\right)t\,dt$$

$$= \frac{2}{T}\left[\int_0^{t_{on}} (I_o + K)\sin\left(\frac{2\pi}{T}\right)t\,dt - \int_{0.}^{t_{on}} Ke^{-t/\tau}\sin\left(\frac{2\pi}{T}\right)t\,dt\right]$$

Letting $a=2\pi/T$ $$b_n = \frac{2(I_o + K)}{T}\left[\frac{-\cos(at)}{a}\right]_o^{t_{on}} -$$

$$\frac{2K}{T}\left[\frac{e^{-t/\tau}((1/\tau)\sin(at) + a\cos(at))}{(1/\tau)^2 + a^2}\right]_0^{t_{on}}$$

$$= \frac{2(I_o + K)}{T}\left[\frac{1 - \cos(at_{on})}{a}\right] -$$

$$\frac{2K}{T}\left[\frac{e^{-t_{on}/\tau}((1/\tau)\sin(at_{on}) + a\cos(at_{on} - a)}{(1/\tau)^2 + a^2}\right]$$

The calculation of Fourier coefficients of the supply current for a right edge aligned PWM pulse is as follows:

$$a_0 = \frac{1}{T} \int_{t_{on}}^T f(t)\,dt$$

$$a_0 = \frac{1}{T} \int_{t_{on}}^T I_O + Kt(1 - e^{-t/\tau})\,dt$$

$$= \frac{1}{T}\left[\int_{t_{on}}^T I_o + \int_{t_{on}}^T Kt\,dt - \int_{t_{on}}^T Kte^{-t/\tau}\,dt\right]$$

$$= \frac{1}{T}[(I_o + K)(T - t_{on}) + K\tau(e^{-T/\tau} - e^{-t_{on}/\tau})]$$

$$a_n = \frac{2}{T} \int_{t_{on}}^T f(t)\cos\left(\frac{2\pi}{T}\right)t\,dt$$

$$= \frac{2}{T} \int_{t_{on}}^T [I_o + K(1 - e^{-t/\tau})]\cos\left(\frac{2\pi}{T}\right)t\,dt$$

-continued $$= \frac{2}{T}\left[\int_{t_{on}}^{T}(I_o+K)\cos\left(\frac{2\pi}{T}\right)t\,dt - \right.$$

Letting a=2π/T $$a_n = \frac{2(I_o+K)}{T}\left[\frac{\sin(at)}{a}\right]_{t_{on}}^{T} - \frac{2K}{T}\left[\frac{e^{-t/\tau}((1/\tau)\cos(at)+a\sin(at))}{(1/\tau)^2+a^2}\right]_{t_{on}}^{T}$$

$$= \frac{2}{T}(I_o+K)\left[\frac{\sin(aT)-\sin(at_{on})}{a}\right]-$$

$$\frac{2K}{T}\left[\frac{e^{-T/\tau}((1/\tau)\cos(aT)+a\sin(aT))}{(1/\tau)^2+a^2}\right]+$$

$$\frac{2K}{T}\left[\frac{e^{-t_{on}/\tau}((1/\tau)\cos(at_{on})+a\sin(at_{on}))}{(1/\tau)^2+a^2}\right]$$

$$b_n = \frac{2}{T}\int_{t0}^{T}f(t)\sin\left(\frac{2\pi}{T}\right)t\,dt$$

$$= \frac{2}{T}\int_{t_{on}}^{T}[I_o+K(1-e^{-t/\tau})]\sin\left(\frac{2\pi}{T}\right)t\,dt$$

$$= \frac{2}{T}\left[\int_{t_{on}}^{T}(I_o+K)\sin\left(\frac{2\pi}{T}\right)t\,dt - \right.$$

$$\left.\int_{t_{on}}^{T}Ke^{-t/\tau}\sin\left(\frac{2\pi}{T}\right)t\,dt\right]$$

Letting a=2π/T $$b_n = \frac{2(I_o+K)}{T}\left[\frac{-\cos(at)}{a}\right]_{t_{on}}^{T} -$$

$$\frac{2K}{T}\left[\frac{e^{-t/\tau}((1/\tau)\sin(at)-a\cos(at))}{(1/\tau)^2+a^2}\right]_{t_{on}}^{T}$$

$$= \frac{2}{T}(I_o+K)\left[\frac{-\cos(aT)+\cos(at_{on})}{a}\right]-$$

$$\frac{2K}{T}\left[\frac{e^{-T/\tau}((1/\tau)\sin(aT)+a\cos(aT))}{(1/\tau)^2+a^2}\right]+$$

$$\frac{2K}{T}\left[\frac{e^{-t_{on}/\tau}((1/\tau)\sin(at_{on})-a\cos(at_{on}))}{(1/\tau)^2+a^2}\right]$$

Once the Fourier coefficients for the left and right edge PWM pulses have been determined, the harmonic contents of the current waveforms can be determined.

Figure 7:
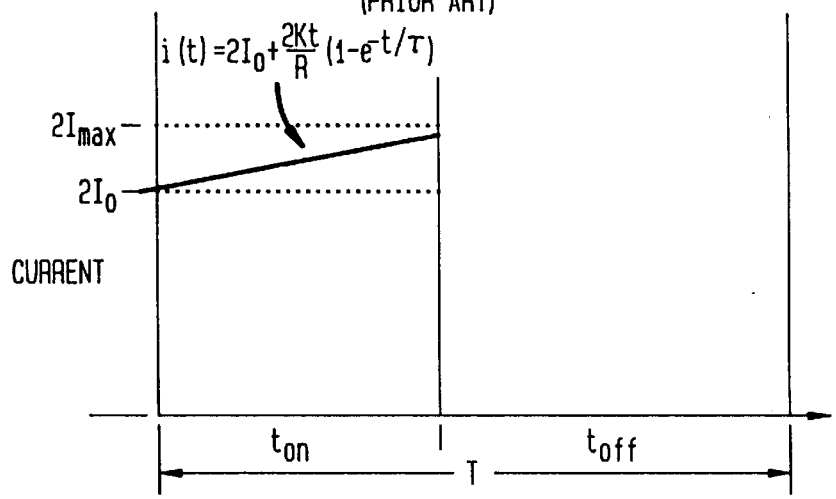
FIG. 7 is a graph illustrating a conventional supply current during a steady state PWM scheme.
Figure 8:
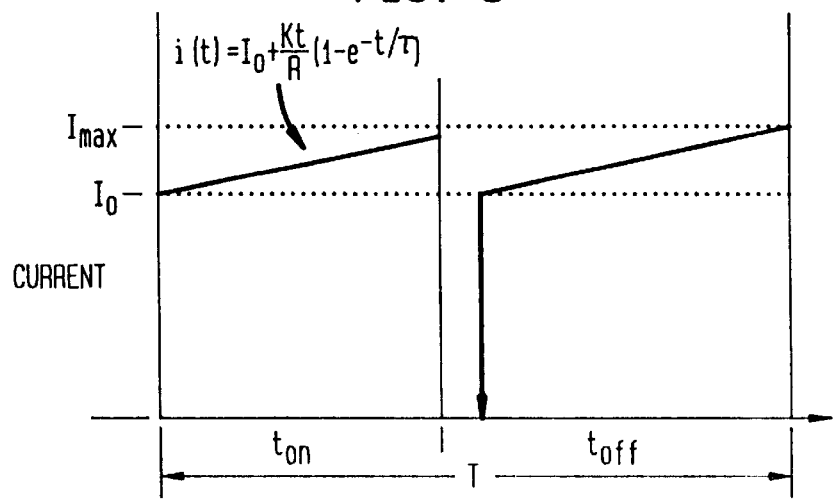
FIG. 8 is a graph illustrating the supply current during steady state PWM operation of a staggered pulse width modulation apparatus and method for EMI minimization in a unipolar phase DC brushless motor constructed in accordance with the principles of the present invention.

For the conventional PWM scheme, the current waveform will appear as illustrated in FIG. 7 for one PWM cycle. For the staggered PWM method in accordance with the principles of the present invention, the current waveform in the disclosed embodiment is as shown in FIG. 8.

The Fourier coefficients for the left and right edge aligned pulses can be used to determine the Fourier coefficients for both the conventional PWM scheme and the staggered PWM method of the present invention. The supply current waveforms and harmonics from a test circuit designed to mimic a two phase load which was continuously energized was compared to eliminate as many variables as possible. The load parameters, the PWM frequency, and the supply voltage were substantially identical as that of the motor load. As this was not a real motor load, but rather an ideal motor load, the maximum magnitude of the back EMF was set to equal 90% of the supply voltage:

$$V_{BEMF\,MAX}=0.9\,V_{bat}$$

The back EMF magnitude at a particular duty cycle was governed by the following relationship:

$$V_{BEMF}=\text{DUTY CYCLE }(\%)*V_{BEMF\,MAX}$$

This assumption was made as the percentage of motor speed was ideally approximated by the percentage of maximum voltage across the motor windings. Accordingly, the back EMF was determined to vary linearly with speed.

The back EMF was modeled as a constant DC voltage in opposition with the motor supply voltage. This assumption was made because in a real motor, a phase winding is energized when the back EMF is at a maximum.

As the back EMF is modeled as a constant DC voltage source, the bottom of the phase was connected back to the positive rail through a freewheeling diode. In a unipolar motor, the bottom of the phase coil is connected to the positive rail via a snubber which serves the dual purpose of keeping the back EMF's of non-conducting phases from being conducted to the positive rail and causing braking torque. The use of a diode to handle the freewheeling current is a convenient simplification in our case, as the only contribution to the supply current harmonics of interest occur when the phase switches are turned on.

Simulations were performed at three (3) duty cycles, namely 10%, 50%, and 90% to illustrate the behavior over low, mid-range, and high duty cycles. The following values were used:

R1=R2=100 mΩ;
L1=L2=65 μH;
S1=S2=Ideal Switches, Ron=10 mΩ, Roff=1 Mega Ω;
Vsupply=+12 V; and
Switching Frequency, $f_s$=23.4 kHz, T=43 μs.

For convenience, SPICE was used to perform the numerical simulations although the simulation could have been performed using the analytical equations derived in the previous section. For the conventional PWM scheme with two phases energized having left edge aligned PWM waveforms, FIGS. 6–11 illustrate the output simulation results for the supply current and the phase coil currents in each of the phase coils performed over 1 ms.

Figure 9:
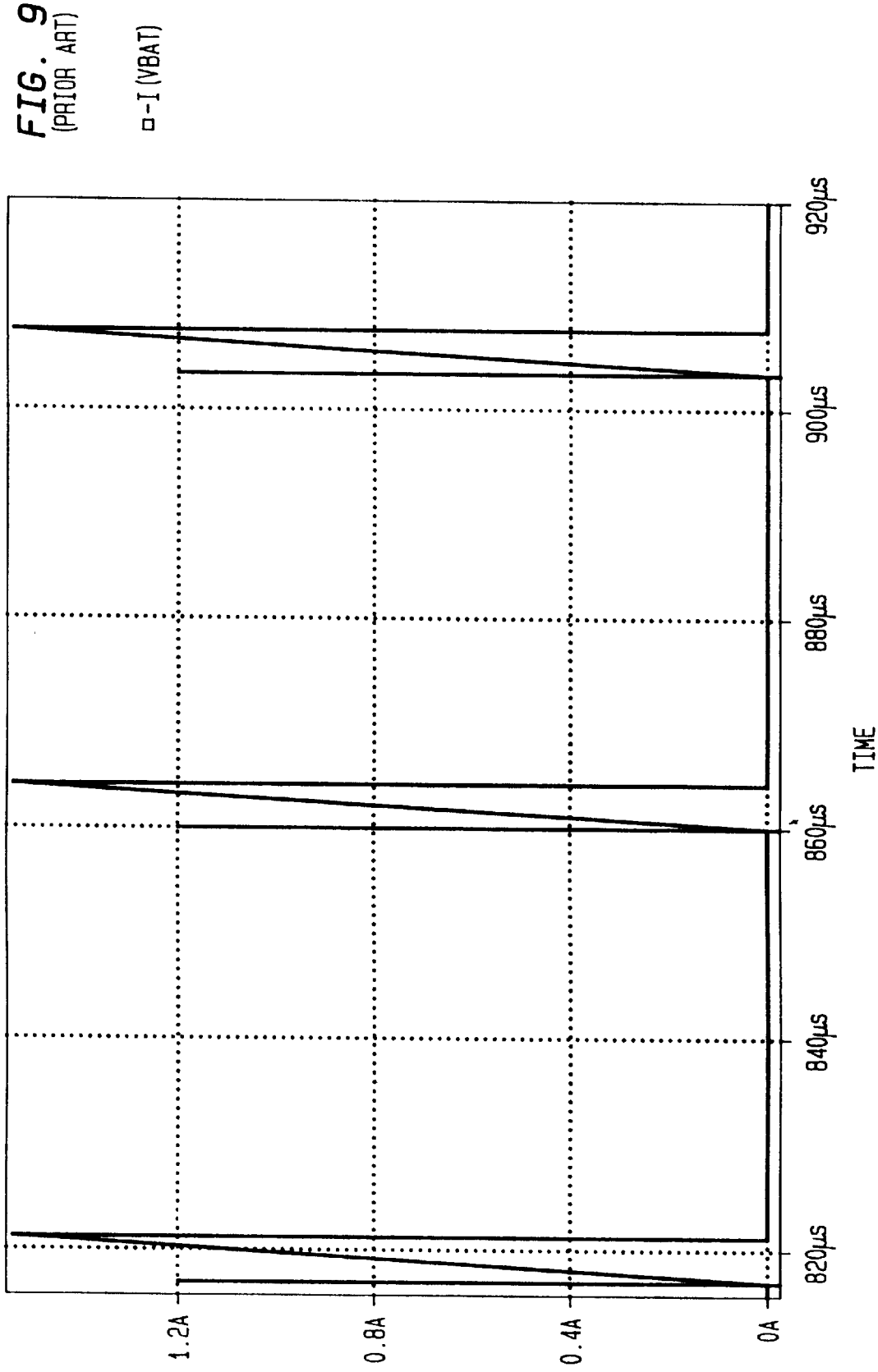
FIG. 9 is a graph illustrating a conventional harmonic minimization circuit analysis for RFI of the supply current at a ten (10%) percent duty cycle.
Figure 10:
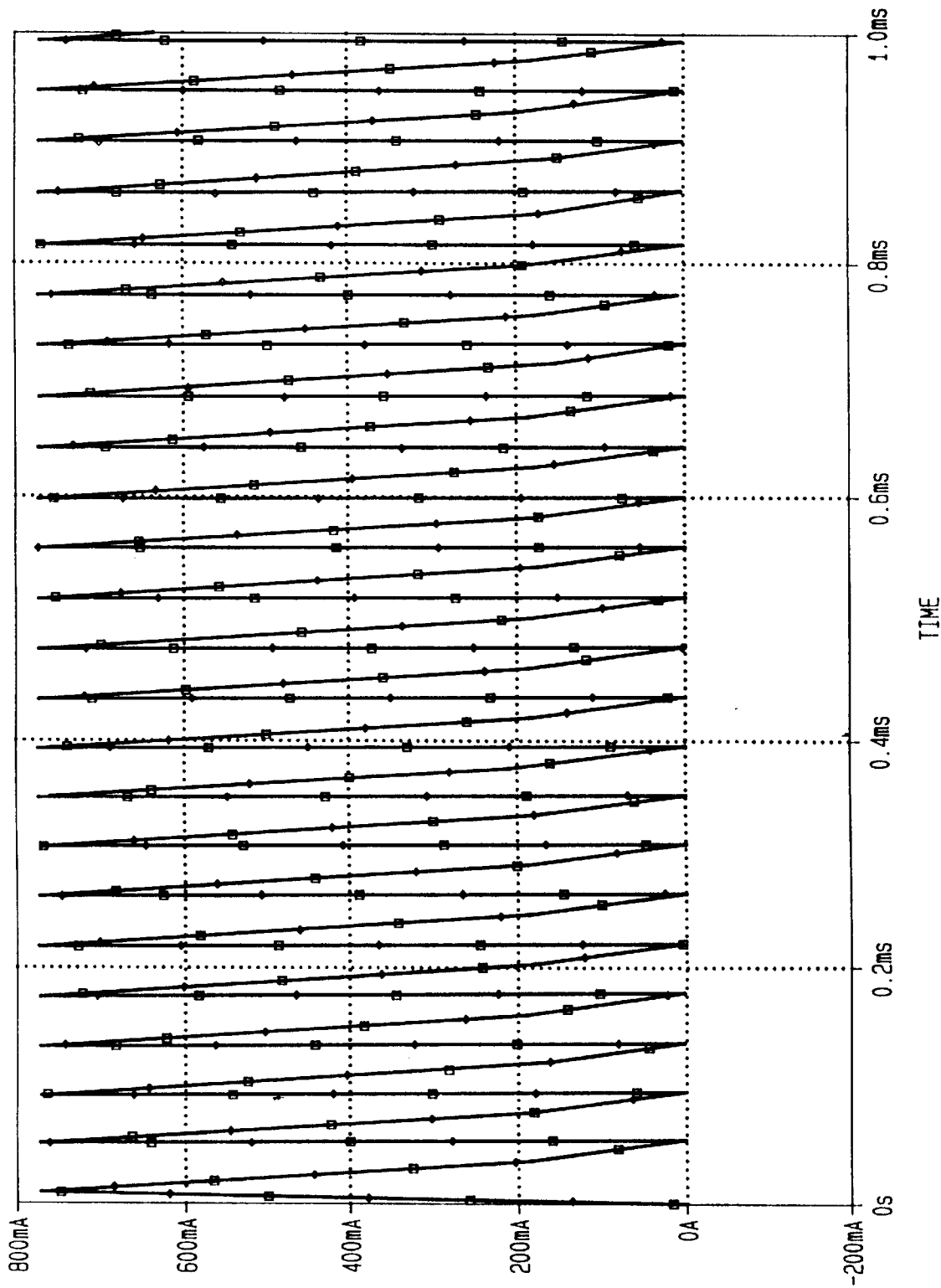
FIG. 10 is a graph illustrating a conventional harmonic minimization circuit analysis for RFI of the phase coil current at a ten (10%) percent duty cycle.

In particular, FIG. 9 illustrates a supply current duty cycle of ten (10%) percent, and FIG. 10 illustrates a phase coil current duty cycle of ten (10%) percent. In the conventional PWM scheme shown in FIG. 9, at a ten (10%) percent duty cycle, the battery supply current rises to 1.2 A and falls back to zero before the beginning of the next switching period. As illustrated in FIG. 10, the current falls to zero (0) as the freewheeling diode conducts energy back to the positive supply rail during this time period. Consequently, as a result of the staggered PWM technique in accordance with the principles of the present invention, there is no build up of current in either phase coil and, as a result, minimal torque generated by the motor.

Figure 11:
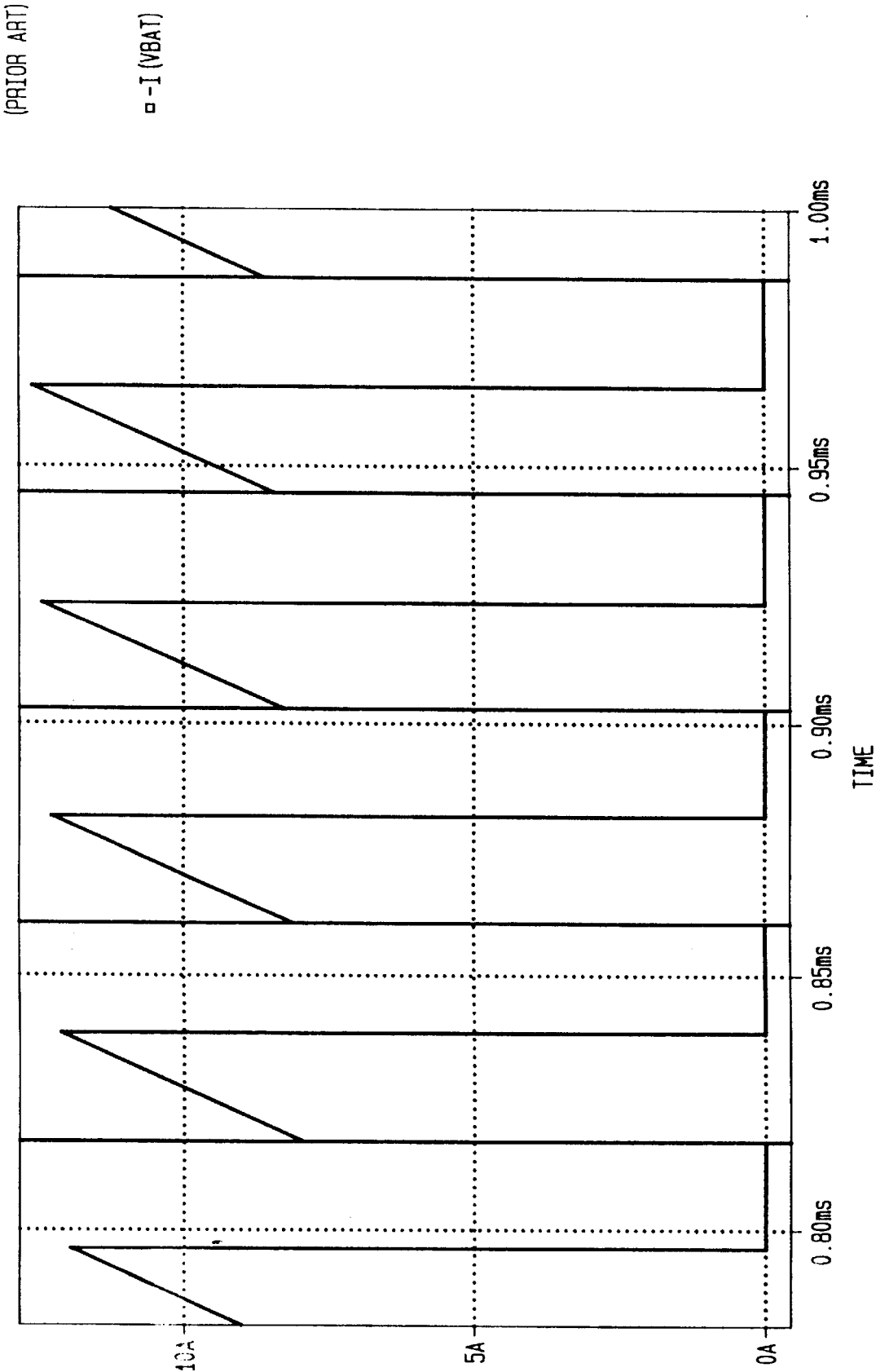
FIG. 11 is a graph illustrating the conventional harmonic minimization circuit analysis for RFI of the supply current at a fifty (50%) percent duty cycle.
Figure 12:
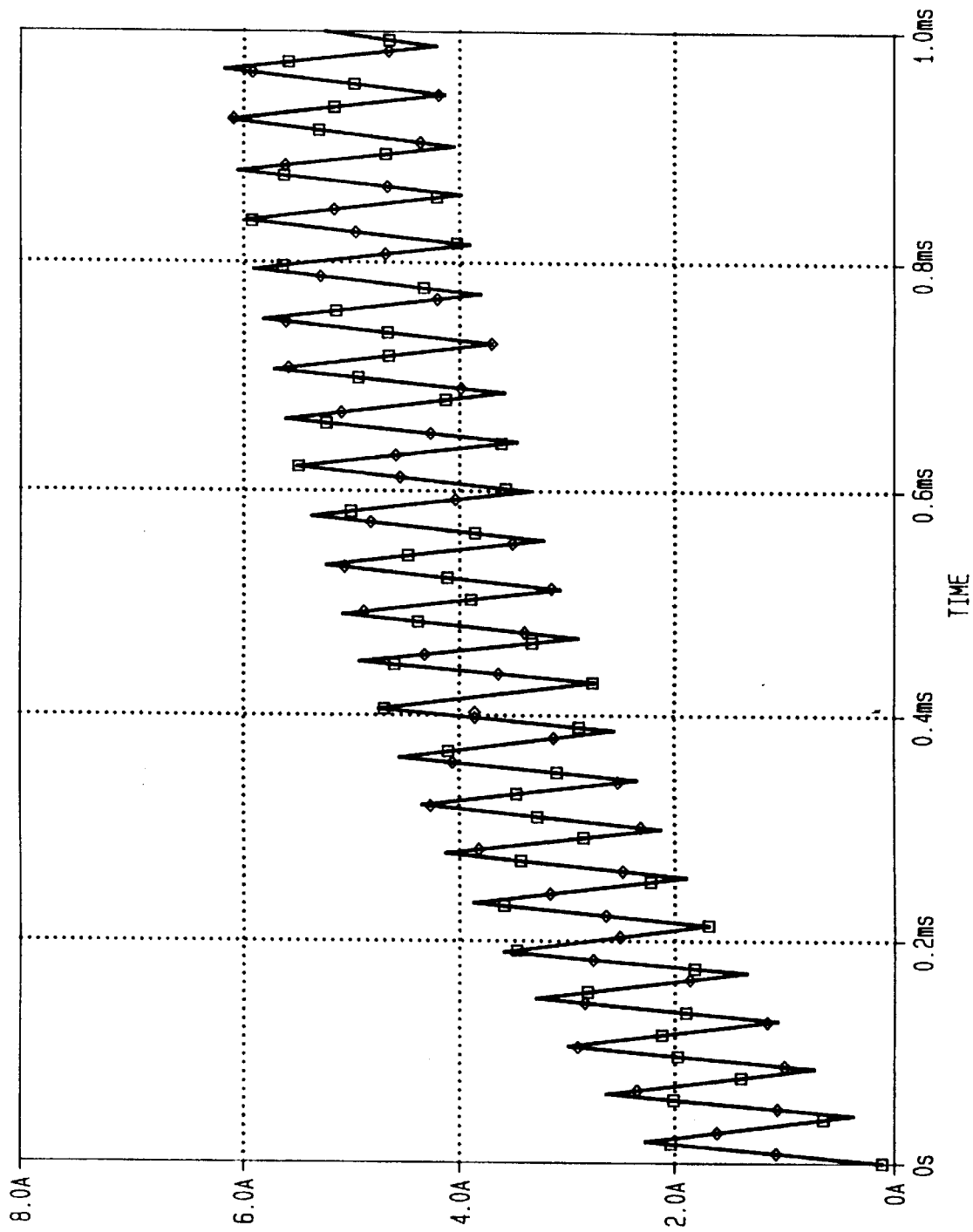
FIG. 12 is a graph illustrating the conventional harmonic minimization circuit analysis for RFI of the phase coil current at a fifty (50%) percent duty cycle.

Similarly, FIG. 11 illustrates a discontinuous mode wherein a supply current duty cycle is fifty (50%) percent, and FIG. 12 illustrates a phase coil current duty cycle of fifty (50%) percent. As illustrated in FIG. 11, when the switches are turned on, the supply current abruptly increases to approximately 8 amps (A), and thereafter increases exponentially until both coils are turned off. The supply current then falls back to zero during the freewheeling portion before the next PWM period. As illustrated in FIG. 12, the current in the coils, however, builds up. At a 50% duty cycle, the motor will deliver a steady RMS torque to the load.

Figure 13:
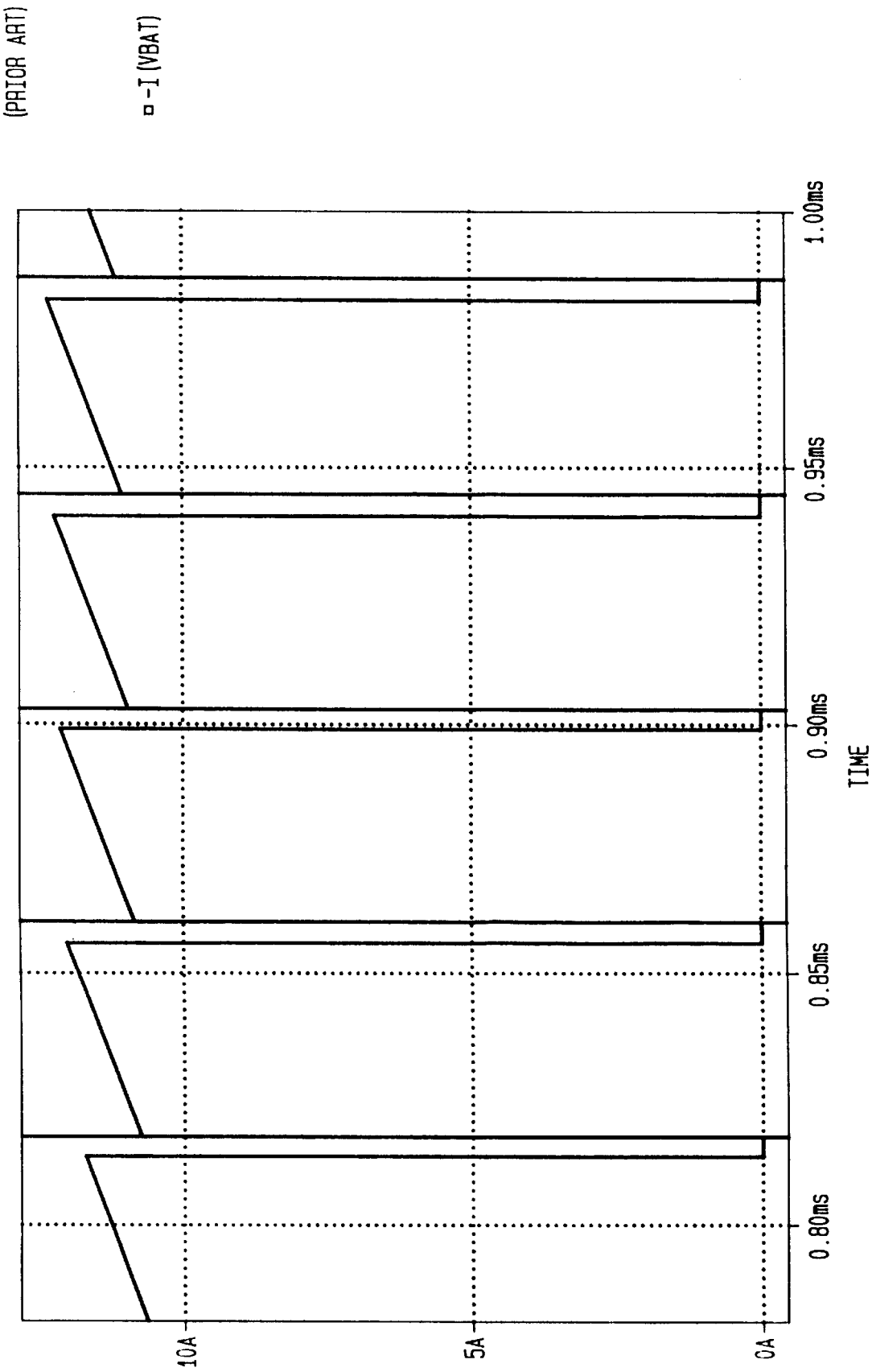
FIG. 13 is a graph illustrating the conventional harmonic minimization circuit analysis for RFI of the supply current at a ninety (90%) percent duty cycle.
Figure 14:
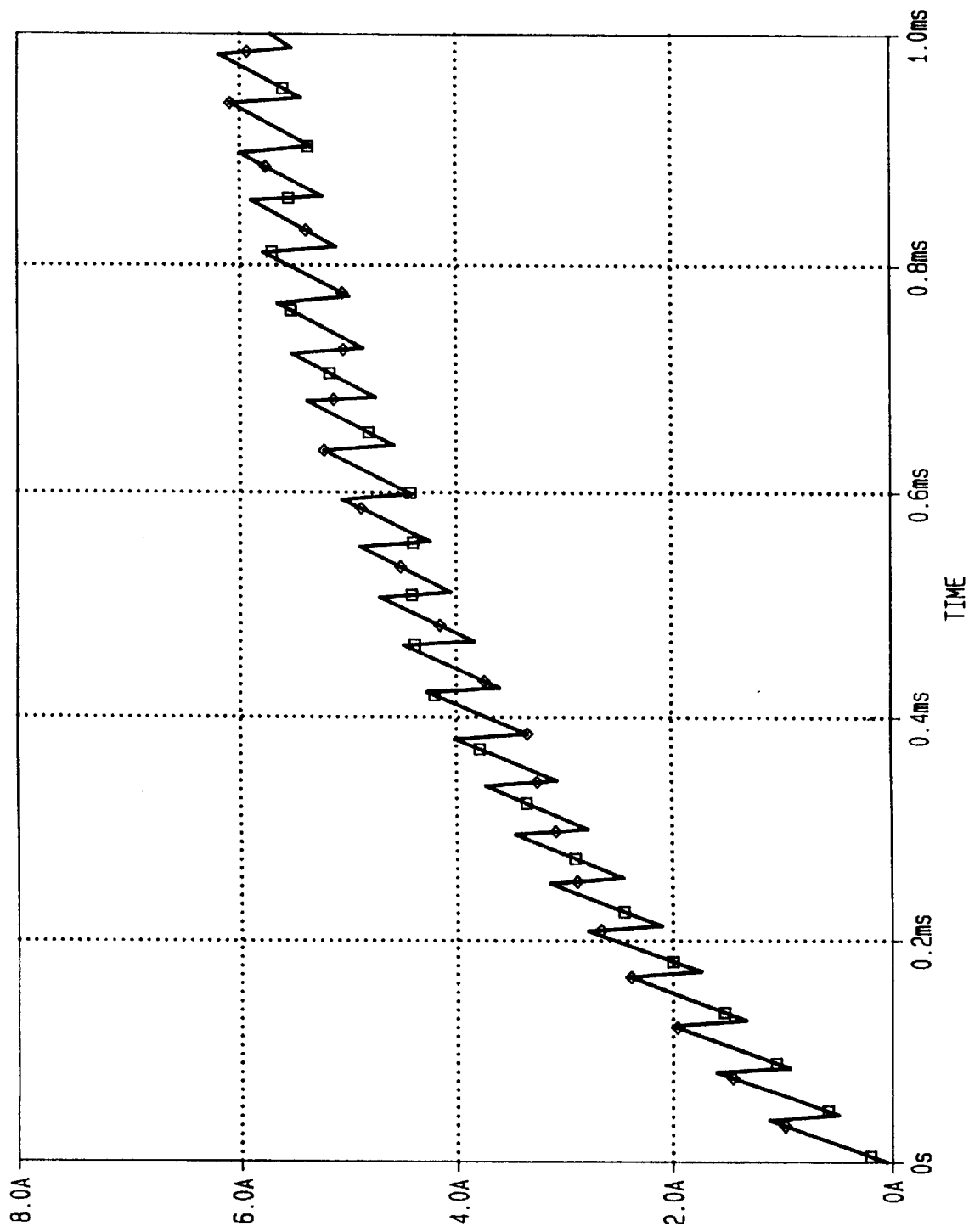
FIG. 14 is a graph illustrating the conventional harmonic minimization circuit analysis for RFI of the phase coil current at a ninety (90%) percent duty cycle.

FIG. 13 illustrates a supply current duty cycle of ninety (90%) percent, while FIG. 14 illustrates a phase coil current duty cycle of ninety (90%) percent. As illustrated in FIG. 13, the supply current abruptly increases to the value of current present in the coils at the end of the freewheeling portion of the PWM cycle, and then increases exponentially from there until the coil is turned off, where it falls back to zero. In this case, the overall change in the supply current is 12 amps when the switches are turned off. As illustrated in FIG. 14, the coil current increases during PWM so there will be a steady torque delivered to the motor.

FIGS. 12 to 17 illustrate results of the disclosed staggered PWM method of the present invention with one energized phase having a left edge aligned PWM waveform and another energized phase having a right edge aligned PWM waveform.

Figure 15:
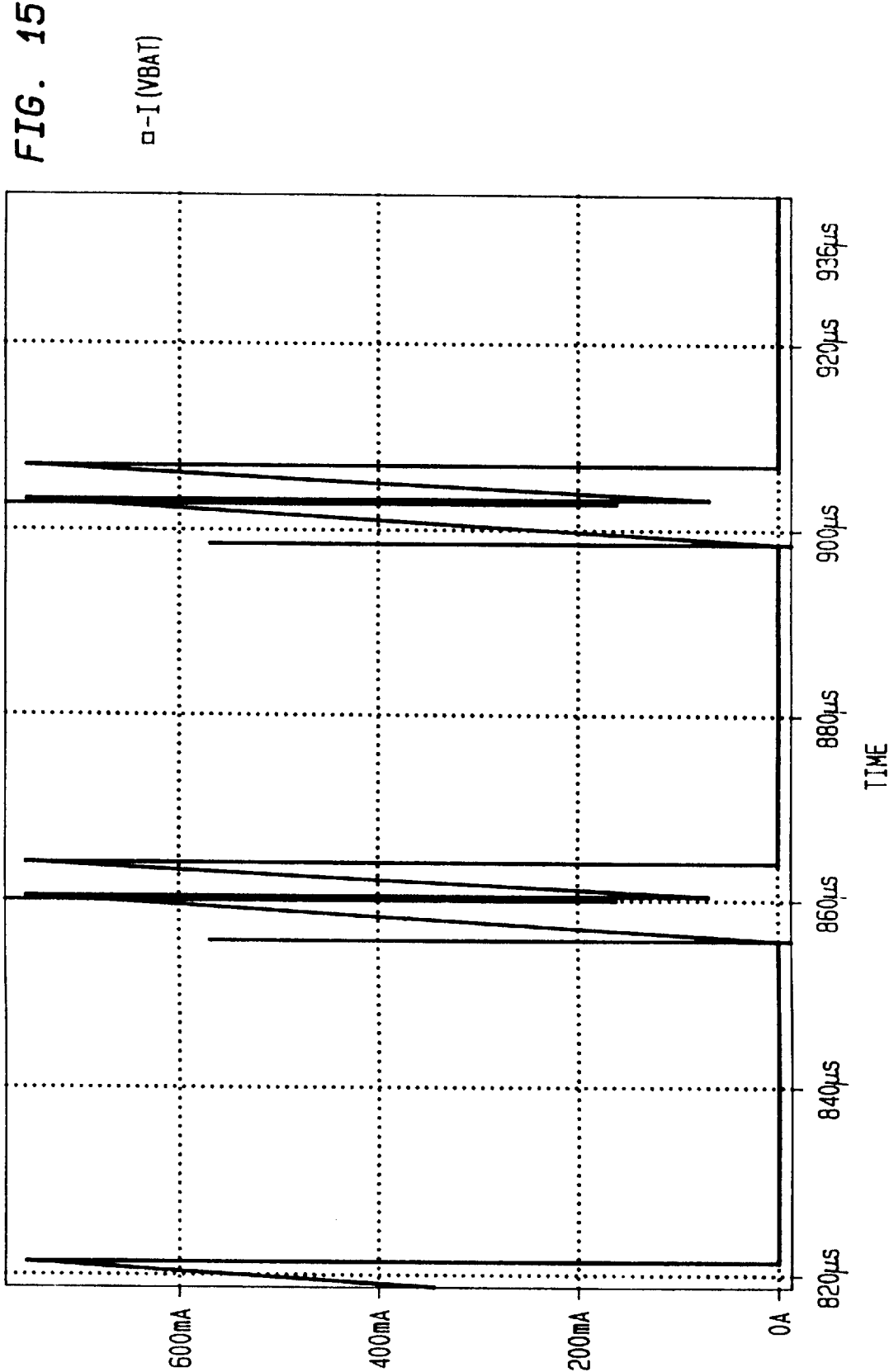
FIG. 15 is a graph illustrating a harmonic minimization circuit analysis for RFI of the supply current at a ten (10%) percent duty cycle of a staggered pulse width modulation apparatus and method for EMI minimization in a unipolar phase DC brushless motor constructed in accordance with the principles of the present invention.
Figure 16:
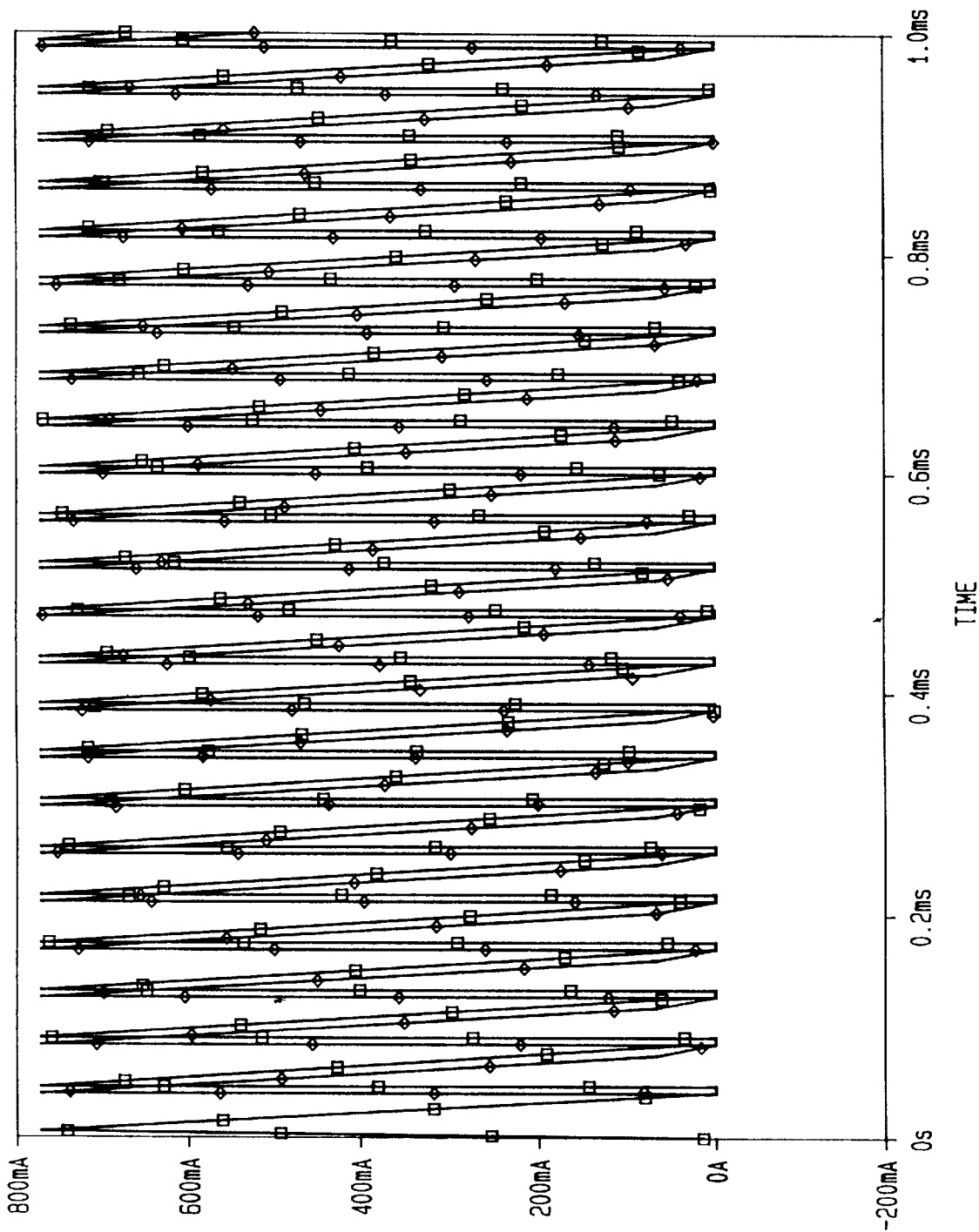
FIG. 16 is a graph illustrating a harmonic minimization circuit analysis for RFI of the phase coil current at a ten (10%) duty cycle in a staggered pulse width modulation apparatus and method for EMI minimization in a unipolar phase DC brushless motor constructed in accordance with the principles of the present invention.

In particular, FIG. 15 illustrates a supply current duty cycle of ten (10%) percent, while FIG. 16 illustrates a phase coil current duty cycle of ten (10%) percent. With a staggered PWM technique in accordance with the principles of the present invention, one coil is energized, and then the other coil is energized. However, at a 10% duty cycle, the supply current still falls to zero due to the properties of the coil. The overall change in current, however, is 0.8 A versus 1.6 A as experienced in the conventional unstaggered PWM technique. This implies that the noise voltage generated by such a scheme would be ½ of that generated by the conventional PWM scheme over the same value of stray inductance in the power leads.

FIG. 16 shows that even at a 10% duty cycle, current will flow in at least one of the coils, albeit for a short period of time. For duty cycles greater than 10%, there will be a more constant torque generated at lower duty cycles than there would be using the conventional PWM scheme.

Figure 17:
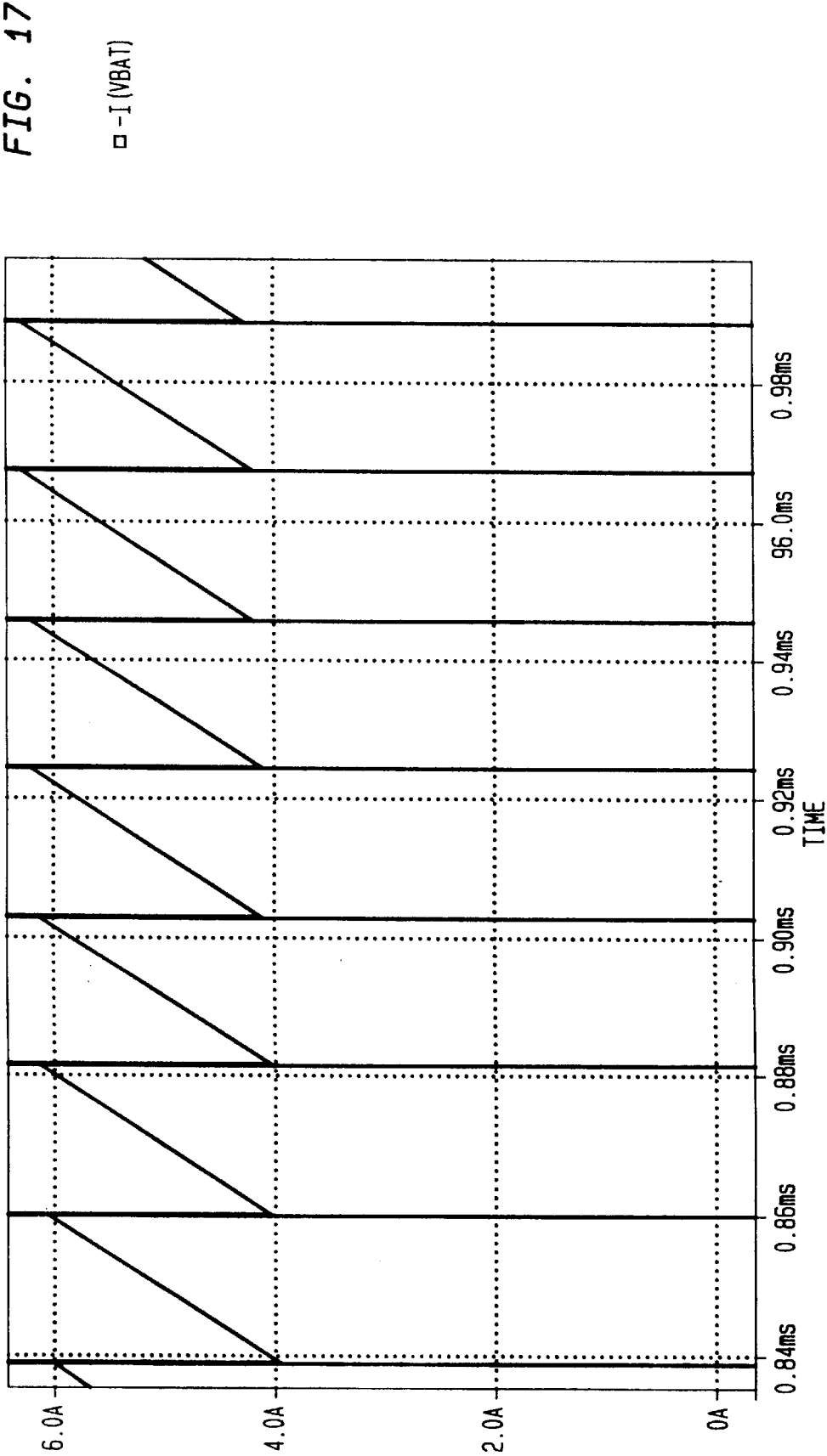
FIG. 17 is a graph illustrating the harmonic minimization circuit analysis for RFI of the supply current at a fifty (50%) percent duty cycle of a staggered pulse width modulation apparatus and method for EMI minimization in a unipolar phase DC brushless motor constructed in accordance with the principles of the present invention.
Figure 18:
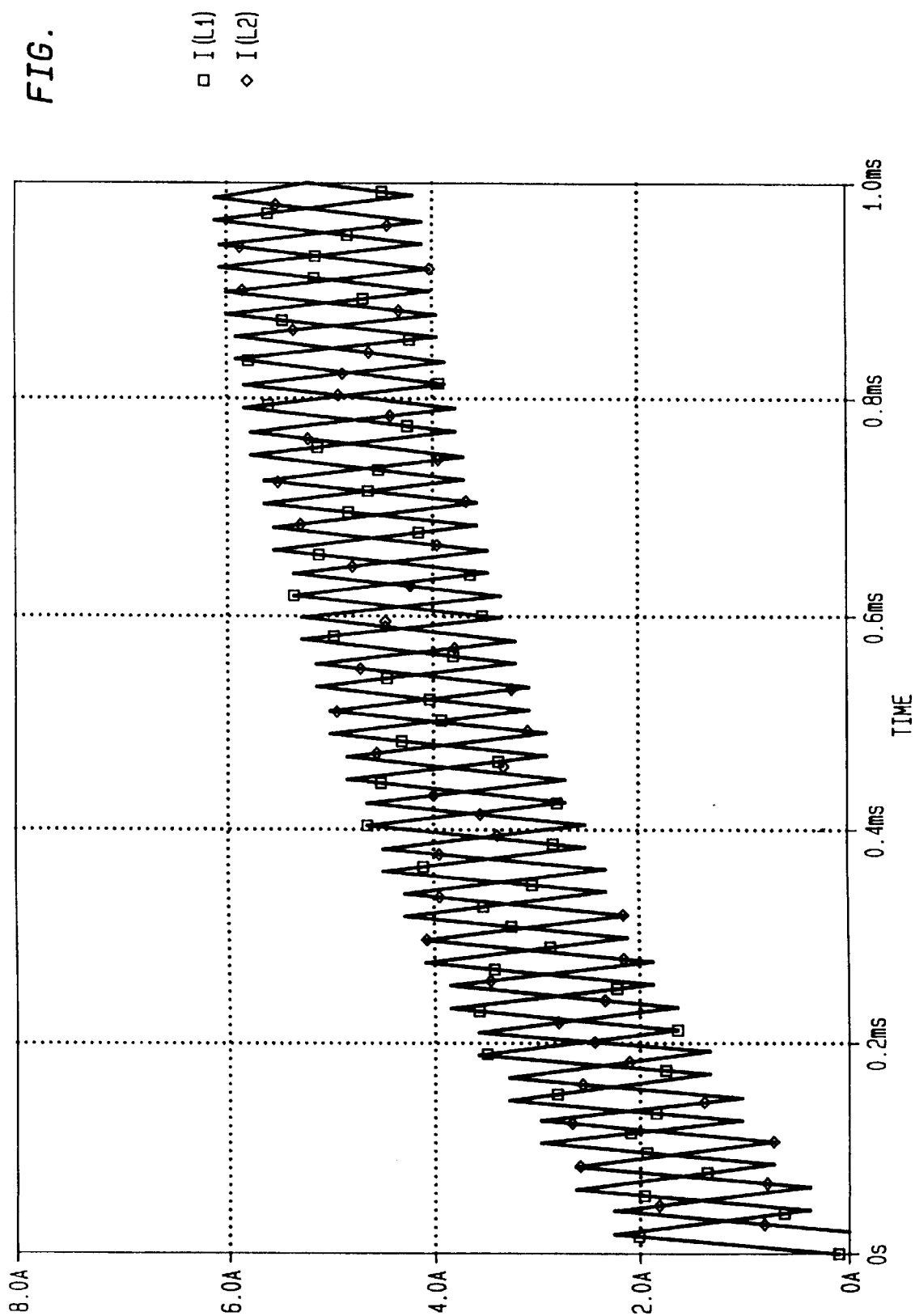
FIG. 18 is a graph illustrating the harmonic minimization circuit analysis for RFI of the phase coil current at a fifty (50%) duty cycle in a staggered pulse width modulation apparatus and method for EMI minimization in a unipolar phase DC brushless motor constructed in accordance with the principles of the present invention.

FIG. 17 illustrates a supply current duty cycle of fifty (50%) percent, while FIG. 18 illustrates a phase coil current duty cycle of fifty (50%) percent. As shown in FIG. 17, the supply current never falls to zero, and the value of a supply current ripple is limited to an exponential increase of current in the coils during the time each one is switched on. This value of ripple is approximately equal to 2 A, contrasted with 12.5 A in the conventional PWM technique. Thus, clearly, any noise generated by di/dt using a 50% duty cycle in accordance with the techniques of the present invention will be much less than that generated with the conventional PWM scheme.

FIG. 18 shows that the current in each coil does not fall to zero, and that the value of current in each coil is equal to the value of current using the conventional prior art PWM scheme.

Figure 19:
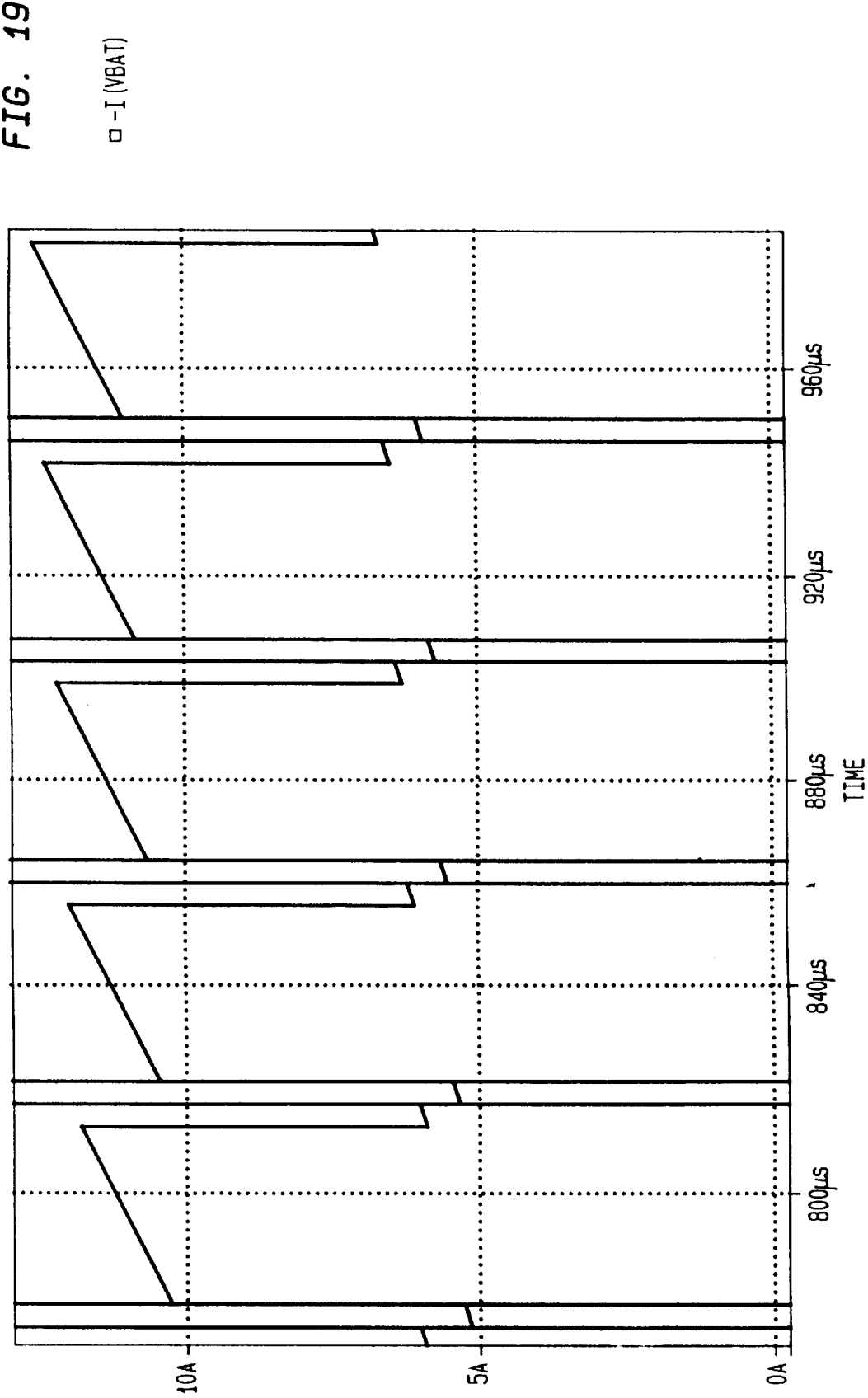
FIG. 19 is a graph illustrating the harmonic minimization circuit analysis for RFI of the supply current at a ninety (90%) percent duty cycle of a staggered pulse width modulation apparatus and method for EMI minimization in a unipolar phase DC brushless motor constructed in accordance with the principles of the present invention.
Figure 20:
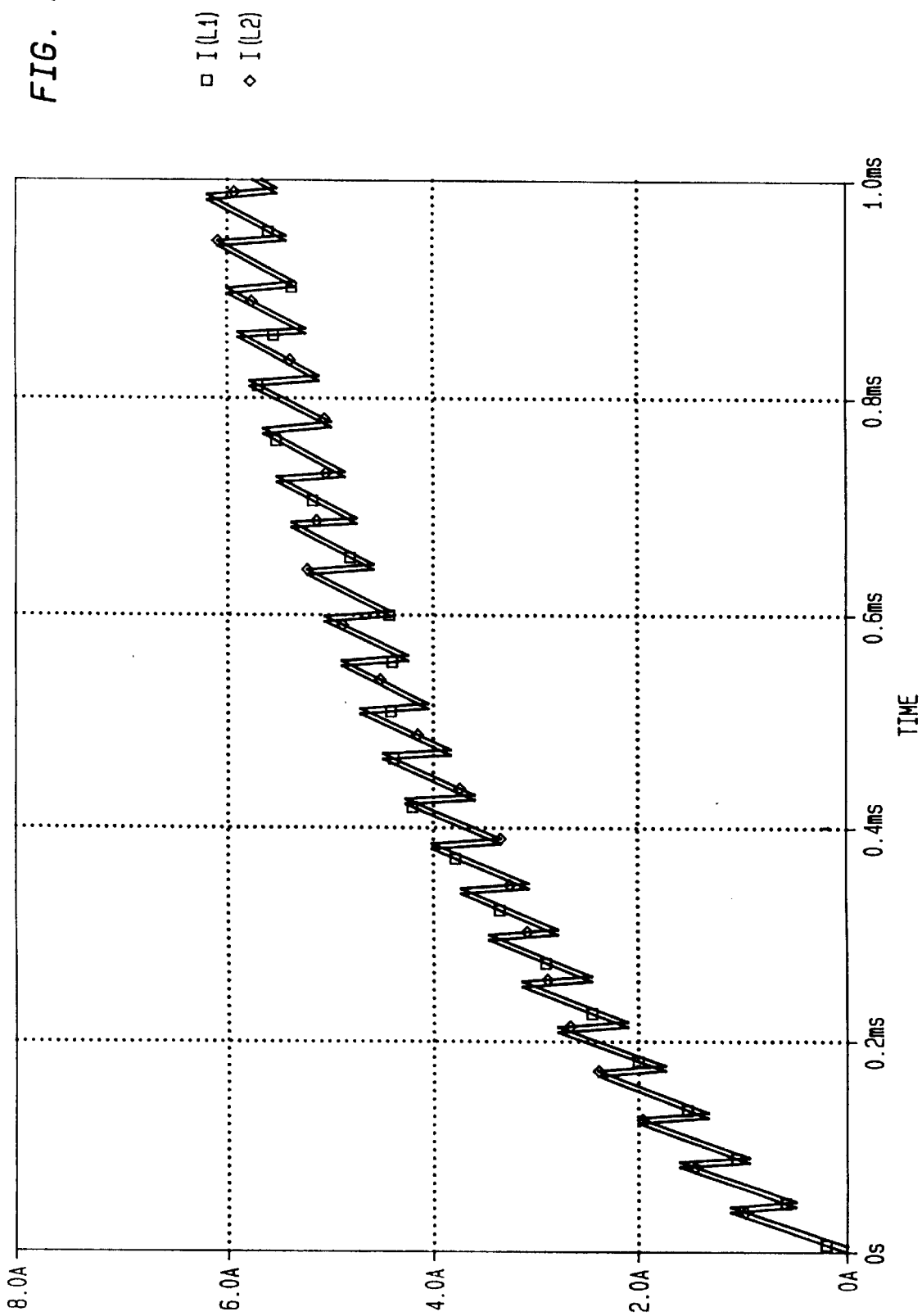
FIG. 20 is a graph illustrating the harmonic minimization circuit analysis for RFI of the phase coil current at a ninety (90%) duty cycle in a staggered pulse width modulation apparatus and method for EMI minimization in a unipolar phase DC brushless motor constructed in accordance with the principles of the present invention.

FIG. 19 illustrates a supply current duty cycle of ninety (90%) percent, while FIG. 20 illustrates a phase coil current duty cycle of ninety (90%) percent.

At a 90% duty cycle, the variation in the supply current is higher than experienced with a duty cycle of 50%. Nevertheless, the current preferably does not fall to zero. Moreover, the variation in the supply current is limited to approximately ½ the maximum supply current because, at any given time, one coil is conducting. The value of current in both coils is the same as that experienced in the conventional PWM scheme, as can be seen by comparing the curves in FIG. 19 with those in FIG. 13. Nevertheless, any noise generated by di/dt will be lower than that generated by the conventional PWM scheme.

Figure 21B:
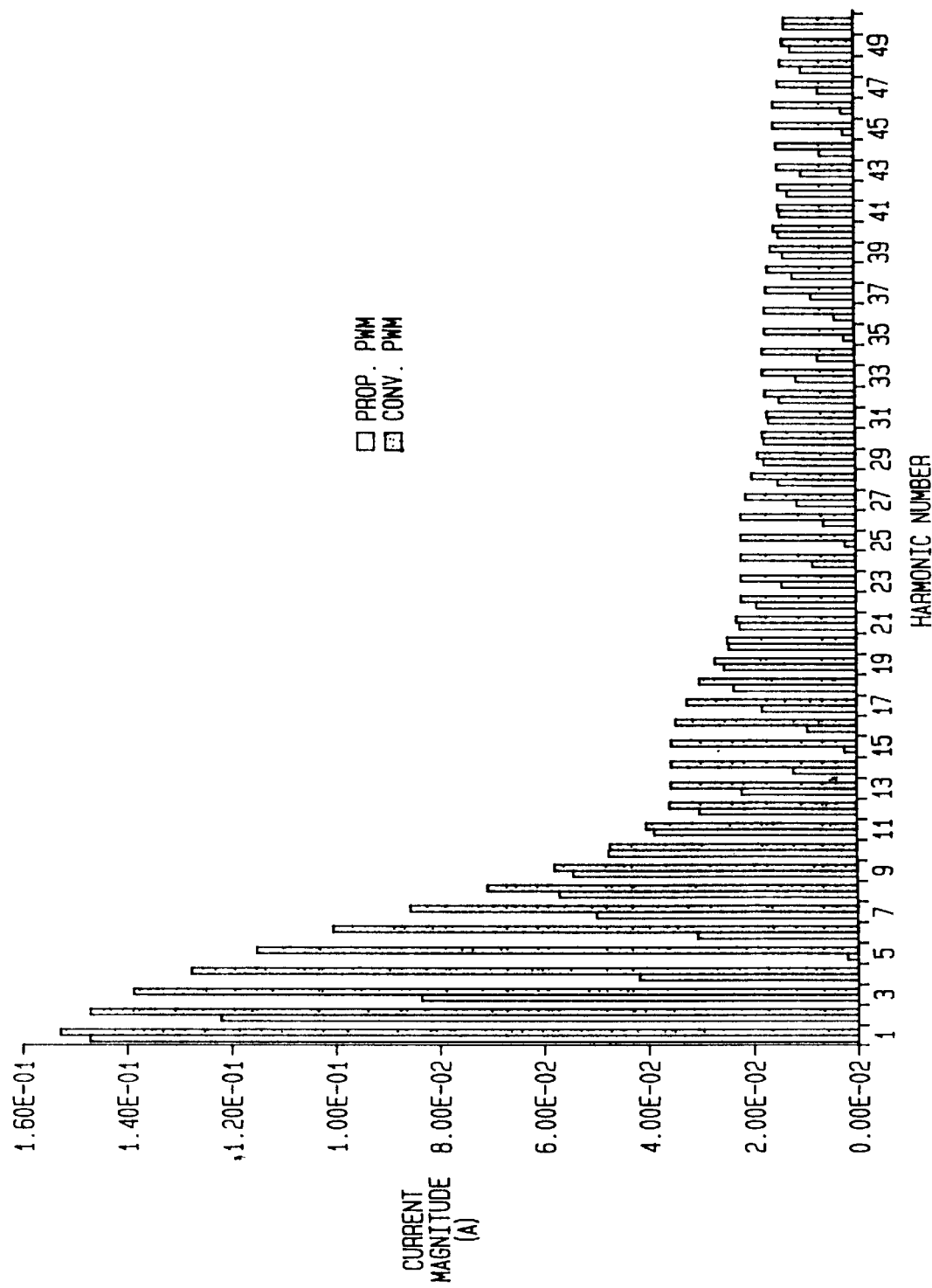
Figure 22B:
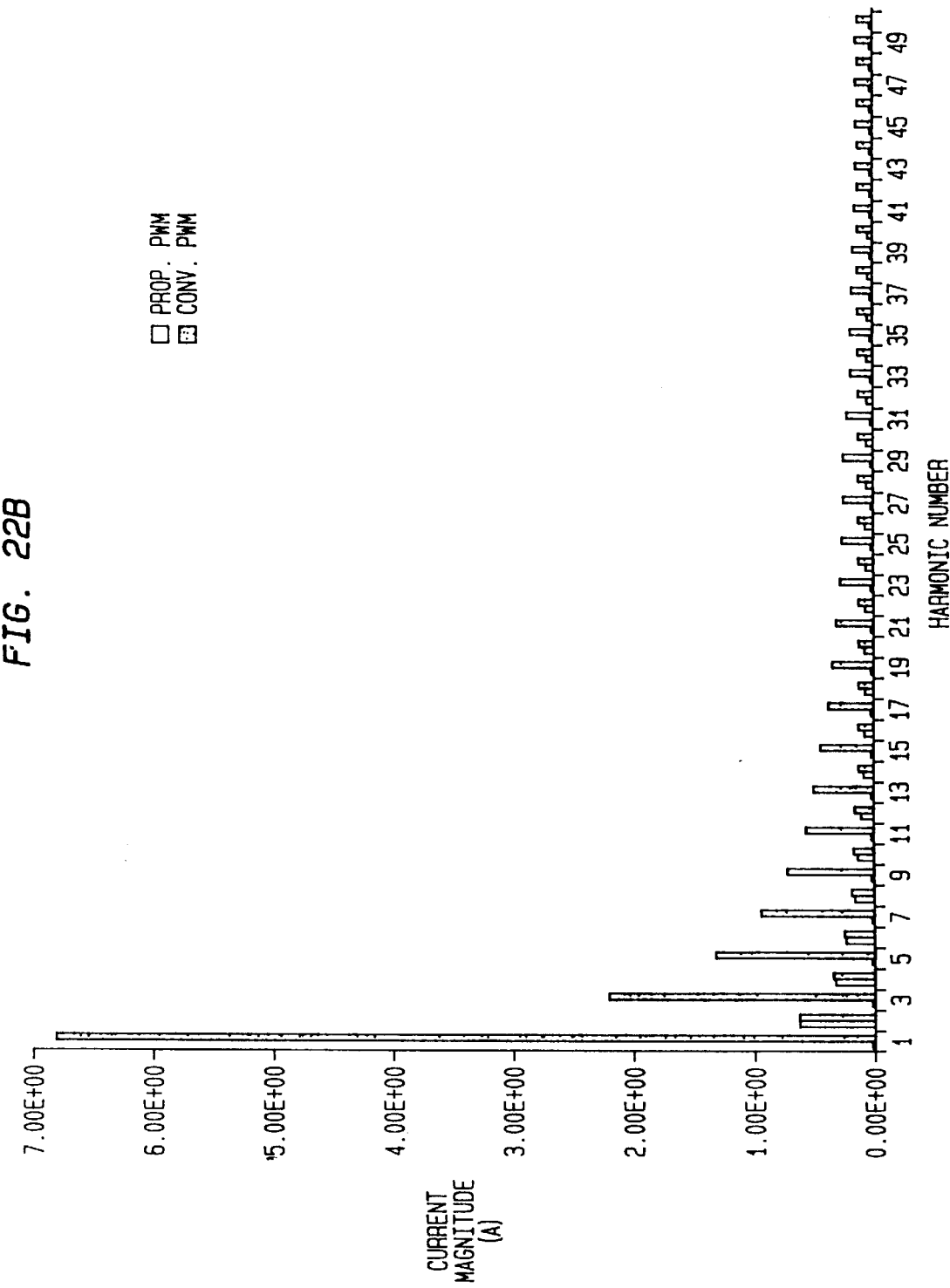
Figure 23B:
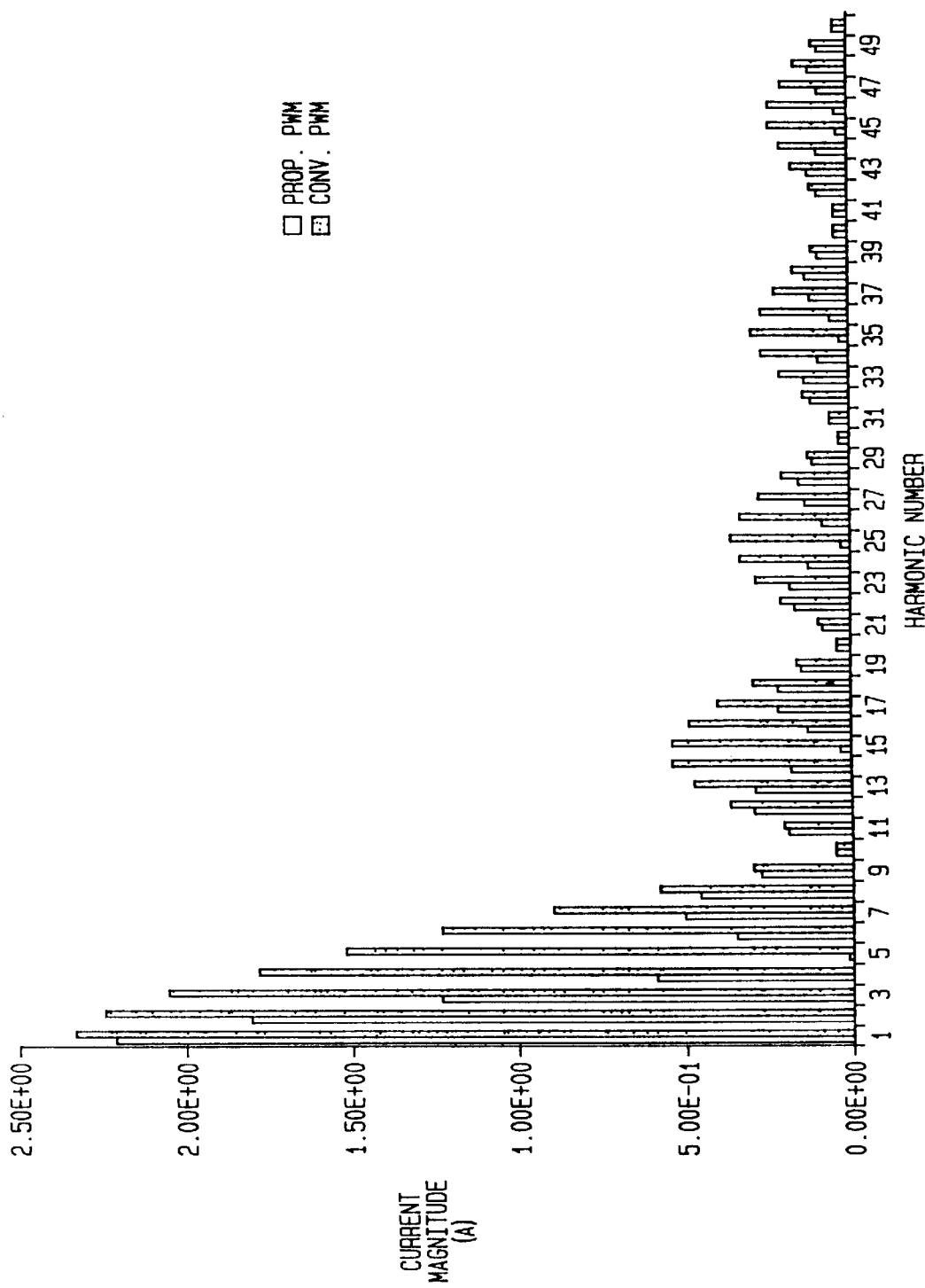
Figure 24:
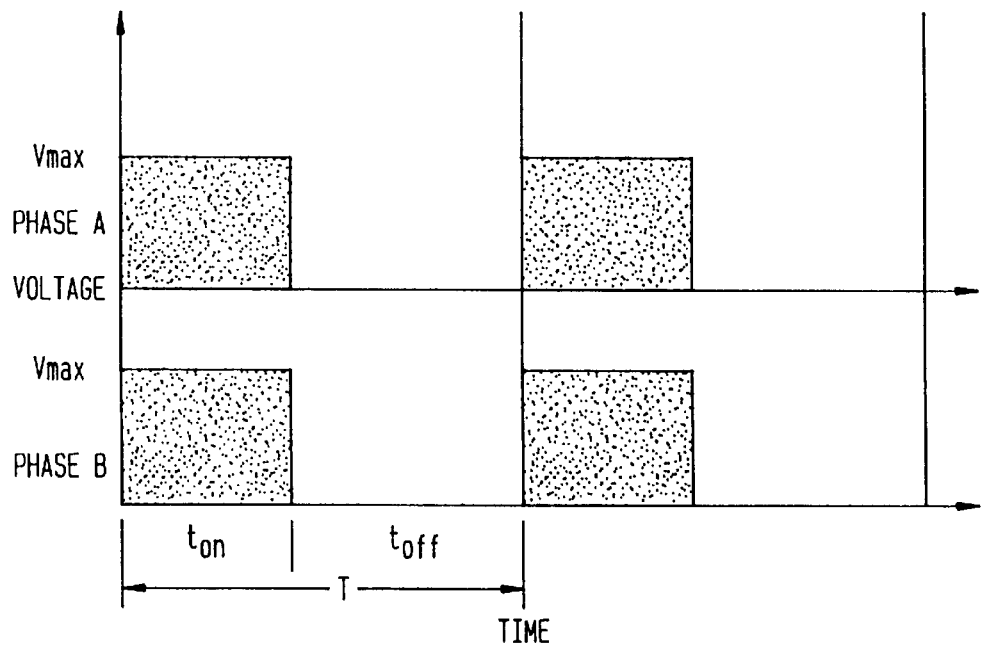
FIG. 24 is a graph illustrating the conventional technique of simultaneously energizing the active phases of a unipolar brushless DC motor when pulse width modulation (PWM) is used.
Figure 25A:
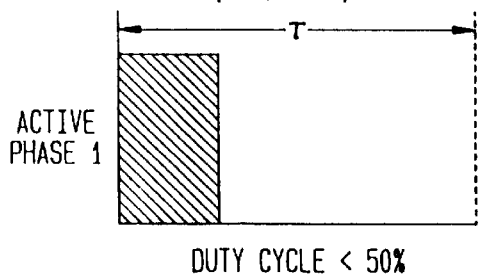
FIGS. 25A and 25B show a conventional PWM technique of activating phases of a motor at a duty cycle of less than 50%.
Figure 25C:
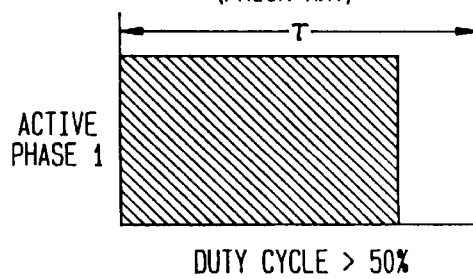
FIGS. 25C and 25D show a conventional PWM technique of activating phases of a motor at a duty cycle of greater than 50%.
Figure 25B:
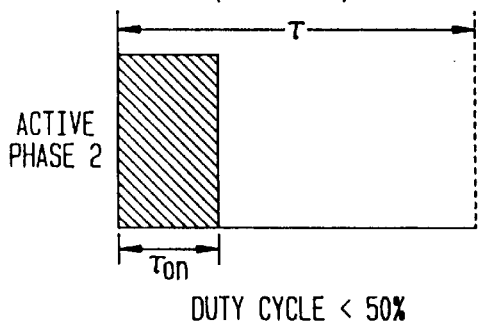
Figure 25D:
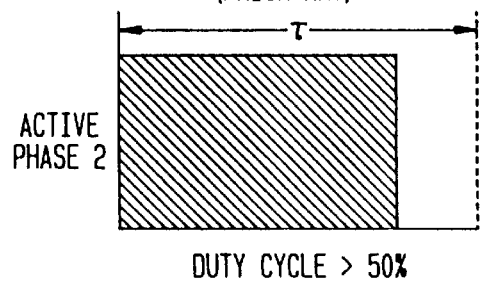

The theoretical current harmonic content of a current supply using the conventional PWM scheme of simultaneous PWM versus staggered PWM in accordance with the principles of the present invention were compared, as shown in FIGS. 21A to 23B. Harmonics up to the 50th multiple of the fundamental chopping frequency (23.4 Hz) were determined and plotted for both the conventional and staggered PWM schemes at duty cycles of 10% (FIGS. 21A and 21B, respectively), 50% (FIGS. 22A and 22B, respectively), and 90% (FIGS. 23A and 23B, respectively).

In particular, FIGS. 21A and 21B show that the harmonics generated by the conventional PWM scheme are greater in magnitude than the majority of the harmonics generated by the staggered PWM scheme in accordance with the principles of the present invention. The harmonic content of the conventional PWM scheme is also more full than that of the present invention, showing a gradual decrease in magnitude after the nth harmonic. Some of the harmonics generated by the proposed PWM scheme are almost zero. There is a node in the spectrum every 10th harmonic starting at the 5th harmonic. Since the harmonic content of the staggered PWM scheme is smaller than that of the conventional PWM scheme, the noise spectrum of the present staggered PWM scheme will be smaller than that of the conventional PWM scheme.

FIGS. 22A and 22B show dramatic results are achieved at a 50% duty cycle. From FIGS. 22A and 22B show that harmonics generated by the staggered PWM scheme are in a worst case, e.g., about ⅓ of the harmonics generated with the conventional PWM scheme, and that the odd harmonics are almost negligible. This is due to very little ripple on the supply current at a 50% duty cycle. It may be observed that there is a node in the spectrum of the staggered PWM scheme in accordance with the principles of the present invention every second harmonic, starting at the first harmonic.

As illustrated in FIGS. 23A and 23B, the overall spectrum for the noise is lower with the staggered PWM scheme in accordance with the principles of the present invention than it is with the conventional PWM scheme. There is a node in the spectrum of the proposed PWM scheme every 5th harmonic, starting at the 5th harmonic. Of significance are the lower magnitudes of the low frequency harmonics. Noise caused by these harmonics is conventionally the most problematic to suppress, involving the use of large value electrolytic and metalized film capacitors across the supply leads. If the low frequency harmonics are lower, then fewer and smaller filtering elements are required.

Thus, the use of a staggered PWM technique in accordance with the principles of the present invention provides numerous advantages over conventional PWM techniques. For instance, a smaller supply current ripple is obtained, particularly for a unipolar motor, resulting in a lower overall magnitude of supply current harmonics at most frequencies. Moreover, a reduced level of current harmonics is obtained resulting in lower values of noise and electromagnetic interference on the motor supply leads. Where a shared snubber is used as in the case of a unipolar motor, lowered ripple current is obtained through the snubber components, allowing smaller snubbing components. Additionally, conventionally-generated high frequency (100 MHz) noise harmonics due to ground bounce caused, e.g., by the simultaneous turning on and off of phase MOSFET's, are inhibited. Furthermore, smaller and fewer RFI filter components are required across the motor leads.

The staggered PWM technique in accordance with the principles of the present invention can be extended to n phases by selectively staggering the PWM periods of the phases. Moreover, the staggered PWM technique in accordance with the principles of the present invention can be extended to provide low frequency block commutation to minimize current and torque ripple.

The technique of the present invention can be implemented to provide block commutation.

Figure 26:
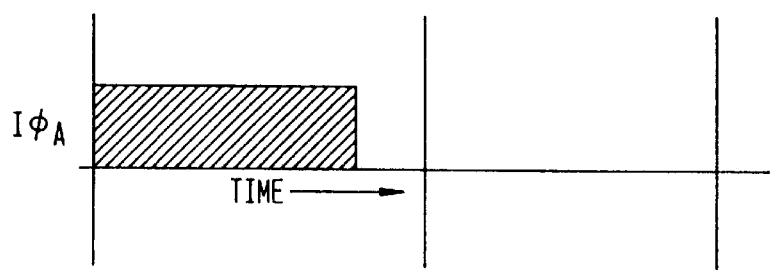
FIG. 26 shows conventional block commutation.

Block commutation involves the energization of a coil without the use of PWM. In particular, the active phase is kept energized for a fixed period of time as shown in FIG. 26.

Figure 27A:
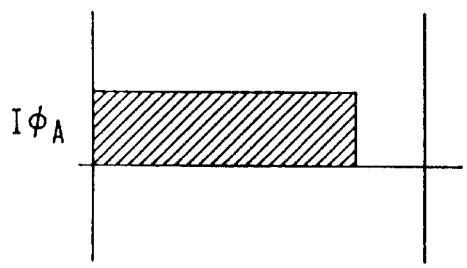
Figure 27B:
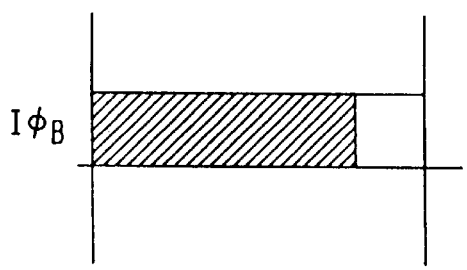
Figure 27C:
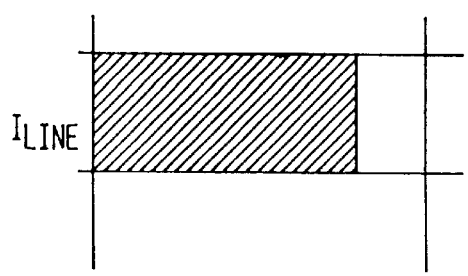
FIG. 27C shows the resulting supply current.

If, for example, two active phases are present, the simultaneous energization of both phases as in conventional devices would result in a large ripple in the supply current and torque. The ripple in the supply current must typically be compensated for using large filter elements such as capacitors. The conventional simultaneous energization of two phases is shown in FIGS. 27A and 27B, with the resulting supply current depicted in FIG. 27C. Note in FIG. 27C that current is discontinuous after the end of the phase and before the next phase. This discontinuity is hard on the motor power supply and may cause large torque pulsations within the motor.

Figure 28A:
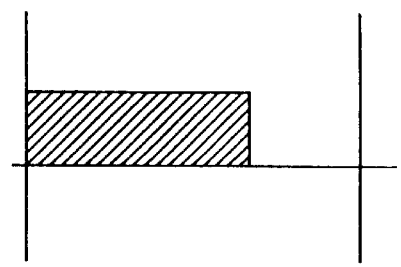
FIGS. 28A to 28C show the staggered activation of phases in accordance with another embodiment of the present invention.
Figure 28B:
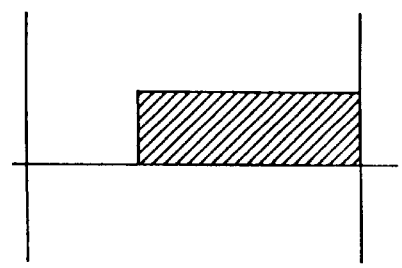
Figure 28C:
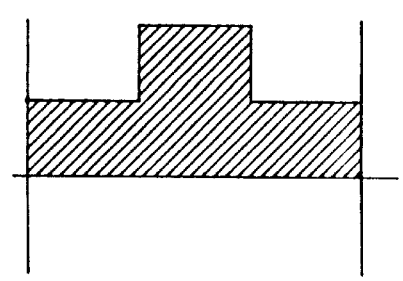

In accordance with this aspect of the present invention, the phase activations are staggered in accordance with the principles of the present invention, e.g., as shown in FIGS. 28A to 28C.

In particular, FIG. 28A shows the activation of a first phase with respect to the activation of a second phase in FIG. 28B. The resulting current drawn from the power supply is depicted in FIG. 28C.

Note that for block times greater than 50% of the active time for any given phase, the current is continuous. Therefore, because of the continuous power draw, fewer (i.e., smaller) filter elements are required.

Thus, staggered activation of the block commutation phases in accordance with the principles of the present invention is easier on the power supply and results in lower torque pulsations. In certain applications, audible noise is lowered and thus is easier on the load as well.

For block activation periods of less than 50% of the active time for any given phase, linear control of the transistors could be used to avoid pulsations in the torque and/or current when the phase back EMFs are lower.

The foregoing exemplary descriptions and the illustrative preferred embodiments of the present invention have been explained in the drawings and described in detail, with varying modifications and alternative embodiments being taught.

While the invention has been described with reference to the exemplary embodiments thereof, those skilled in the art will be able to make various modifications to the described embodiments of the invention without departing from the true spirit and scope of the invention.

What is claimed is:

1. A motor driver circuit comprising:
   a first driver having a first pulsed signal to activate a first winding of a motor wherein said first winding has an associated first time constant; and
   a second driver having a second pulsed signal to activate a second winding of said motor wherein said second winding has an associated second time constant;
   wherein individual pulses of said first pulsed signal and individual pulses of said second pulsed signal are staggered within one of said first time constant and said second time constant.

2. The motor driver circuit according to claim 1, wherein:
   said individual pulses of said first pulsed signal are one of left justified and right justified with respect to said first time constant of one said first winding of said motor; and
   said individual pulses of said second pulsed signal are the other of left justified and right justified with respect to said second time constant of said second winding of said motor.

3. The motor driver circuit according to claim 1, wherein:
   said first winding and said second winding are simultaneously activated with only one of said first driver and said second driver driving current through said respective first winding and said second winding at any one time.

4. The motor driver circuit according to claim 1, wherein:
   said individual pulses of said first pulsed signal do not overlap in time with said individual pulses of said second pulsed signal.

5. The motor driver circuit according to claim 1, wherein:
   said first pulsed signal has a duty cycle of no greater than 50%.

6. The motor driver circuit according to claim 1, wherein:
   said second pulsed signal has a duty cycle of no greater than 50%.

7. The motor driver circuit according to claim 6, wherein:
   said second pulsed signal has a duty cycle of no greater than 50%.

8. The motor driver circuit according to claim 1, wherein:
   said first pulsed signal and said second pulsed signal each have a duty cycle of less than 100%.

9. The motor driver circuit according to claim 1, wherein:
   said motor is a unipolar phase DC brushless motor.

10. The motor driver circuit according to claim 1, wherein:
    said motor comprises at least four different phases.

11. The motor driver circuit according to claim 1, wherein:
    said motor comprises at least five different phases.

12. The motor driver circuit according to claim 1, wherein:
    said motor driver circuit is adapted to activate said first winding of said motor and said second winding of said motor in a same phase.

13. A method of driving a motor, comprising:
    simultaneously activating a first winding of said motor and a second winding of said motor during a same phase;
    driving said first winding with a first pulsed signal;
    driving said second winding with a second pulsed signal; and
    staggering individual pulses of said first pulsed signal with respect to individual pulses of said second pulsed signal within said same phase.

14. The method of driving a motor according to claim 13, wherein:
    said staggering is substantially 100% staggering such that said individual pulses of said first pulsed signal do not substantially overlap in time said individual pulses of said second pulsed signal.

15. The method of driving a motor according to claim 13, wherein:
    said step of driving said first winding with said first pulsed signal is not performed substantially simultaneously with said step of driving said second winding with said second pulsed signal.

16. The method of driving a motor according to claim 13, wherein:
    said first pulsed signal has a duty cycle of no greater than 50%.

17. The method of driving a motor according to claim 13, wherein:
    said second pulsed signal has a duty cycle of no greater than 50%.

18. The method of driving a motor according to claim 13, wherein:
said second pulsed signal has a duty cycle of no greater than 50%.

19. The method of driving a motor according to claim 13, wherein:
said first pulsed signal and said second pulsed signal each have a duty cycle of less than 100%.

20. The method of driving a motor according to claim 13, further comprising:
activating a unipolar phase DC brushless motor.

21. The method of driving a motor according to claim 13, further comprising:
activating at least four different phases of a motor.

22. The method of driving a motor according to claim 13, further comprising:
activating at least five different phases of a motor.

23. The method of driving a motor according to claim 13, further comprising:
activating said first winding of said motor and said second winding of said motor in a same phase.

24. The method of driving a motor according to claim 13, wherein said step of staggering individual pulses comprises:
justifying said individual pulses of said first pulsed signal to one of a right edge and a left edge of a period of time based on a time constant of one of said first winding and said second winding; and
justifying said individual pulses of said second pulsed signal to the other of said right edge and said left edge of a period of time based on a time constant of one of said first winding and said second winding.

25. Apparatus for driving a motor, comprising:
means for simultaneously activating a first winding of said motor and a second winding of said motor during a same phase;
means for driving said first winding with a first pulsed;
means for driving said second winding with a second pulsed signal; and
means staggering individual pulses of said first pulsed signal with respect to individual pulses of said second pulsed signal within said same phase.

26. The apparatus for driving a motor according to claim 25, wherein:
said means for staggering staggers said individual pulses of said first pulsed signal substantially 100% with respect to individual pulses of said second pulsed signal such that said individual pulses of said first pulsed signal do not substantially overlap in time said individual pulses of said second pulsed signal.

27. The apparatus for driving a motor according to claim 25, wherein said means for staggering comprises:
a free wheeling diode connected to a voltage source on said motor.

28. A method for minimizing electromagnetic interference in a unipolar phase motor having a supply current, the motor further having a plurality of motor phases energizable with a pulsed signal, the method comprising:
calculating current harmonics on a right edge aligned pulsed signal;
calculating current harmonics on a left edge aligned pulsed signal;
determining a supply current by summing said calculated current harmonics for said right edge aligned pulsed signal and said current harmonics for said left edge aligned pulsed signal;
energizing one of said plurality of motor phases; and
staggering individual pulses of said right edge aligned pulsed signal with respect to individual pulses of said left edge aligned pulsed signal for each successive motor phase by varying an activation of any two adjacently energized phases based on said determined supply current, whereby at least one of electromagnetic interference and current harmonic generation due to any increase in said supply current are minimized.

29. The method according to claim 28, further comprising:
determining a Fourier coefficient for said right edge aligned pulsed signal; and
determining a Fourier coefficient for said left edge aligned pulsed signal.

30. The method according to claim 28, further comprising:
providing said right edge aligned pulsed signal at a frequency of approximately 23.4 KHz.

31. A method for minimizing electromagnetic interference in a motor having a supply current, said motor further having a plurality of motor phases, said method comprising:
staggering individual pulses in any one activation of a phase of said motor by alternately energizing any two windings of said motor.

32. A block commutation motor driver circuit comprising:
a first driver circuit to activate a first winding of a motor with a first signal during a first portion of a phase; and
a second driver circuit to activate a second winding of said motor with a second signal during a second portion of said phase;
wherein said first signal is staggered with respect to said second signal during said phase.

33. A motor driver circuit comprising:
a first drive pulse to activate a first winding of a motor, said first winding having a first time constant;
a second drive pulse to activate a second winding the motor, said second winding having a second time constant; and
wherein said first winding and said second winding are activated by said first drive pulse and said second drive pulse staggered within an activation period selected to be one of said first time constant and said second time constant.

34. The motor driver circuit according to claim 33, wherein:
said first drive pulse is one of left and right justified with respect to said first time constant within said activation period; and
said second drive pulse is the other of the left and right justified with respect to said second time constant within said activation period.

35. The motor driver circuit according to claim 33, wherein:
said first winding and said second winding are substantially simultaneously activated within said activation period.

36. The motor driver circuit according to claim 33, wherein:
said first winding is activated by a first driver circuit driving current through said first winding; and
said second winding is activated by a second driver circuit driving current through said second winding.

37. The motor driver circuit according to claim 33, wherein:

said first drive pulse does not overlap in time with said second drive pulse within said activation period.

38. The motor driver circuit according to claim 33, wherein:

said first drive pulse and said second drive pulse each have a duty cycle of no greater than 50%.

39. The motor driver circuit according to claim 33, wherein:

said first drive pulse and said second drive pulse each have a duty cycle of less than 100%.

40. The motor driver circuit according to claim 33, in combination with a unipolar phase DC brushless motor.

41. The motor driver circuit according to claim 33, in combination with a motor having at least four different phases.

42. The motor driver circuit according to claim 33, in combination with a motor having at least five different phases.

* * * * *